US012734920B2

(12) United States Patent
Kuperman et al.

(10) Patent No.: US 12,734,920 B2
(45) Date of Patent: Sep. 15, 2026

(54) SYSTEM AND METHOD FOR ALIGNMENT OF WIRELESS POWER TRANSFER SYSTEMS

(71) Applicant: B. G. NEGEV TECHNOLOGIES AND APPLICATIONS LTD, Beer Sheva (IL)

(72) Inventors: Alon Kuperman, Beer Sheva (IL); Andrey Vulfovich, Beer Sheva (IL); Yegal Darhovsky, Beer Sheva (IL); Vladimir Yuhimenko, Beer Sheva (IL)

(73) Assignee: B. G. NEGEV TECHNOLOGIES AND APPLICATIONS LTD., AT BEN-GURION UNIVERSITY, Beer Sheva (IL)

( * ) Notice: Subject to any disclaimer, the term of this patent is extended or adjusted under 35 U.S.C. 154(b) by 0 days.

(21) Appl. No.: 18/841,376

(22) PCT Filed: Feb. 27, 2023

(86) PCT No.: PCT/IB2023/051812

§ 371 (c)(1), (2) Date: Aug. 25, 2024

(87) PCT Pub. No.: WO2023/161895

PCT Pub. Date: Aug. 31, 2023

(65) Prior Publication Data

US 2025/0187470 A1 Jun. 12, 2025

Related U.S. Application Data

(60) Provisional application No. 63/314,417, filed on Feb. 27, 2022.

(51) Int. Cl.

*B60L 53/39* (2019.01)
*B60L 53/12* (2019.01)

(Continued)

(52) U.S. Cl.

CPC ............... *B60L 53/39* (2019.02); *B60L 53/12* (2019.02); *B60L 53/22* (2019.02); *B60L 53/36* (2019.02);

(Continued)

(58) Field of Classification Search

CPC ........................................................ B60L 53/39

See application file for complete search history.

(56) References Cited

U.S. PATENT DOCUMENTS

2010/0161216 A1 6/2010 Yamamoto
2014/0015328 A1 1/2014 Beaver et al.

(Continued)

FOREIGN PATENT DOCUMENTS

CN 110509792 A 11/2019
CN 112737142 A 4/2021

(Continued)

OTHER PUBLICATIONS

Asa E., et al., "A Novel Phase Control of Semi Bridgeless Active Rectifier for Wireless Power Transfer Applications," 2015 IEEE Applied Power Electronics Conference and Exposition, pp. 3225-3231.

(Continued)

*Primary Examiner* — Daniel Kessie

(74) *Attorney, Agent, or Firm* — Nathan & Associates Patent Agents Ltd.; Menachem Nathan

(57) ABSTRACT

A wireless power transmission (WPT) system may include: a charge transmitter; a charge receiver configured to receive wireless power from the charge transmitter, wherein the charge receiver includes a short circuit assembly configured, when activated, to short circuit a rectifier of the charge receiver; and a controller configured to activate the short circuit assembly, and to determine based on an inverter output current of the charge transmitter that an optimal (Continued)

alignment between the charge transmitter and charge receiver has been achieved.

20 Claims, 14 Drawing Sheets

(51) Int. Cl.
*B60L 53/22* (2019.01)
*B60L 53/36* (2019.01)

(52) U.S. Cl.
CPC ....... *B60L 2210/30* (2013.01); *B60L 2210/40* (2013.01)

(56) References Cited

U.S. PATENT DOCUMENTS

| | | | | |
|---|---|---|---|---|
| 2018/0037126 | A1 | 2/2018 | Jang et al. | |
| 2019/0165614 | A1 | 5/2019 | Afridi et al. | |
| 2024/0195224 | A1* | 6/2024 | Wang | H02J 50/80 |

FOREIGN PATENT DOCUMENTS

| | | | | | |
|---|---|---|---|---|---|
| CN | 113479078 | A | | 10/2021 | |
| DE | 102015223230 | A1 | | 5/2017 | |
| JP | 2016063551 | A | * | 4/2016 | |
| JP | 2022158387 | A | * | 10/2022 | |
| KR | 20220011667 | A | * | 1/2022 | H02M 3/33576 |

OTHER PUBLICATIONS

International Search Report and Written Opinion for International Application No. PCT/IB2023/051812, mailed Jul. 19, 2023, 10 Pages.

Lovison G., et al., "Secondary-side-only Control for High Efficiency and Desired Power with Two Converters in Wireless Power Transfer Systems," 2017, IEEJ Journal of Industry Applications, vol. 6(6), pp. 473-481.

Extended European Search Report for European Application No. EP237594379 mailed Feb. 13, 2026, 13 Pages.

Israel Office Action for Patent Application No. 315210 dated May 25, 2026, 04 pages.

* cited by examiner

800

Calculated *k*

0 0.1 0.2 0.3 0.4 0.5 0.6

0.1 0.2 0.3 0.4 0.5 0.6 0.7

Actual *k*

SYSTEM AND METHOD FOR ALIGNMENT OF WIRELESS POWER TRANSFER SYSTEMS

CROSS-REFERENCE TO RELATED APPLICATIONS

This patent application claims priority and/or benefit from U.S. provisional patent application 63/314,417, filed Feb. 27, 2022, titled "Method of Automatic Alignment Between Transmitting and Receiving Platforms of a Wireless Power Transfer System", and which application is incorporated herein by reference in its entirety.

FIELD

Embodiments disclosed herein relate generally to systems and methods for wireless power transfer.

INTRODUCTION

Batteries of stationary electric vehicles may be charged via a plug-in interface or by employing wireless power transmission (WPT). WPT-based vehicle battery charging techniques offer many practical advantages over plug-in charging interfaces. One main advantage is that WPT obviates the need for physically coupling the power source with the vehicle battery. WPT charging technique may be based on inductive charging, where an alternating current in charge transmitter coil induces an alternating current in charge receiver coil. The induced current may be rectified and used to charge the battery of an electric vehicle.

The description above is presented as a general overview of related art in this field and should not be construed as an admission that any of the information it contains constitutes prior art against the present patent application.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein and should not be considered limiting in any way. Like elements in different drawings may be indicated by like numerals. Elements in the drawings are not necessarily drawn to scale.

DETAILED DESCRIPTION

Figure 1A:
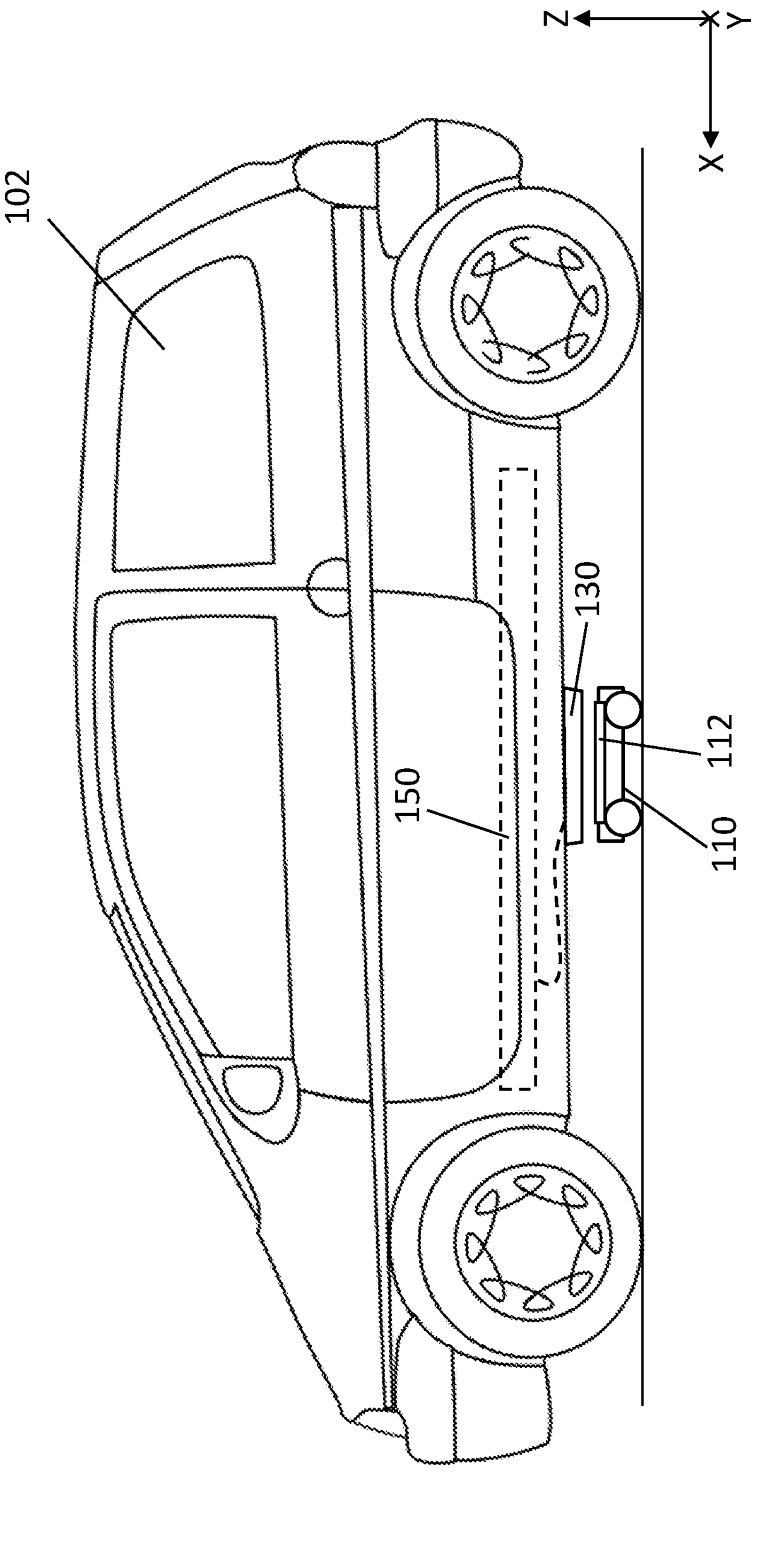
FIGS. 1A-1C are drawings showing the principal components of a system for charging an EV using WPT according to some implementations.

Compared to plug-in interfaces, WPT systems may be wasteful, with significantly lower efficiency caused, for instance, by suboptimal transmitter-receiver alignment. In an ideal arrangement, a correct horizontal, vertical and angular transmitter-receiver alignment should result in optimal coupling coefficient between transmitter wireless coupler and receiver wireless coupler for high power and/or efficiency transmission.

It is noted that merely to simplify the discussion herein, without be construed as limiting, embodiments are discussed herein with respect to a cartesian coordinate system where the x-axis is parallel to the vehicle's longitudinal axis, and the Z-axis is normal to ground. However, embodiments of the system and method may also employ alternative coordinate systems.

In some implementations, in connection wireless charging of a vehicle, a charge transmitter may be installed in a fixed position, and alignment with the charge receiver may then be dependent on accurate parking of the vehicle such that that receiver wireless coupler is substantially aligned with the stationary transmitter wireless coupler. In other implementations, a mobile power unit with an on-board transmitter may move under a stationary vehicle with an on-board receiver and position itself to attain optimal alignment between a transmitter wireless coupler and a stationary receiver wireless coupler.

Currently proposed mobile power units may be equipped with dedicated positioning sensors that aid in the charge transmitter-receiver alignment, however these may increase the cost and complexity of the mobile power unit and also of the charge-receiver. Further, due to variations in vehicle dimensions and charge receiver positioning, such sensor-based alignment may not provide a maximum power and/or efficiency transfer.

There is therefore a need for mobile power unit alignment systems that enable alignment between wireless couplers of a charge transmitter and charge receiver for improved, maximum and/or most efficient power transfer without the need for dedicated positioning sensors.

Improvement of power transfer efficiency may be obtained at a second relative alignment position between the mobile power unit alignment systems, where in the second relative alignment position is different from a first relative alignment position.

In some examples, changing a relative position between a charge transmitter and a charge receiver may not only pertain to adapting their relative positions in horizontal and/or vertical directions X, Y, and/or Z directions, but also to changing tilt of the charge transmitter relative to the charge receiver (e.g., changing relative yaw, pitch, roll orientation about the principle axes Y, X, and/or Z, respectively).

Embodiments disclosed herein provide for systems and methods that may automatically, or semi-automatically align a charge transmitter with a charge receiver for maximum and/or most efficient power transfer. Some embodiments disclosed herein provide for systems and methods for improving or optimizing manual alignment of a charge transmitter with a charge receiver for maximum and/or most efficient power transfer.

Embodiments disclosed herein provide for systems and methods that may automatically or semi-automatically align a charge transmitter of a mobile power unit with a stationary charge receiver of an electric vehicle for maximum and/or most efficient power transfer, for example, without the need for dedicated positioning sensors. Alternative embodiments disclosed herein provide for systems and methods that may automatically or semi-automatically align a stationary charge transmitter with a mobile charge receiver of an electric vehicle for improved, optimum, maximum or most efficient power transfer, for example, without the need for dedicated positioning sensors.

In some embodiments, a short circuit assembly may be provided in the rectifier input of the charge receiver. With the charge transmitter positioned, for example, beneath the charge receiver, the rectifier input may be short circuited by the short circuit assembly, the inverter output current of the charge transmitter may be measured, and the measured inverter output current may then be used to determine the transmitter/receiver coupling coefficient.

In some embodiments, the position of the mobile power unit relative to the charge receiver may be incrementally shifted horizontally and/or vertically (relative to a ground surface) while determining whether the position shift improves or worsens the coupling coefficient that may be relative to an optimal coupling coefficient value. In some embodiments, the position of an EV with a charge receiver relative to a stationary charge transmitter may be incrementally shifted horizontally and/or vertically, while determining whether the position shift improves or worsens the coupling coefficient that may be relative to an optimal coupling coefficient value.

In some embodiments, an iterative process of such incremental movements may be performed until sufficiently improved or optimal position of the charge transmitter and receiver relative to each other in regards to the coupling coefficient is found, and the charge transmitter and receiver may be said to be in improved or optimal alignment for maximum and/or most efficient power transfer.

It is noted that the terms "maximum" and "optimum" used herein, as well as grammatical variations thereof, may encompass the meaning of the term "about maximum" and "about optimum".

Unless otherwise specified, the terms 'about' and/or 'close' with respect to a magnitude or a numerical value may imply to be within an inclusive range of −10% to +10% of the respective magnitude or value.

Having achieved sufficiently improved or optimal alignment, the short circuit assembly may be deactivated and energy transfer between the charge transmitter and receiver may commence.

In some embodiments, the improved or optimal positioning may be determined directly from inverter current measurements without determining the coupling coefficient.

In some embodiments, components for measurement of the inverter output current be may included in mobile power units, and no dedicated positioning sensors are required for improving alignment and/or for determining the optimal alignment.

Furthermore, the short circuit assembly may require minimal electronic components and changes to the rectifier input with certain rectifier topologies already containing all required components for implementing embodiments of the system and/or method discussed.

As used herein, the term "electric vehicle" (EV) may refer to electric vehicles and hybrid electric vehicles, which are vehicles that utilize energy stored in batteries to provide electricity-based driving energy. The broad term "vehicle" may include any type of mobile platform such as but not limited to cars, trucks, vans, buses, trains, motorcycles, electric bicycles, and scooters, as well as other categories such autonomous robots, manned and/or unmanned terrestrial, and/or aerial vehicles (e.g., aerial drones) and/or watercrafts.

Implementations may additionally or alternatively pertain to the wireless charging of mobile devices, where the system is employed for improved or optimizing manual, semi-automatic, and/or automated alignment of a charge receiver included in the mobile device relative to the charge transmitter. In some examples, using the method described herein, the system may provide a user of a mobile device with instructions for positioning the mobile device relative to the charge transmitter for improved or optimized charging.

Figure 1B:
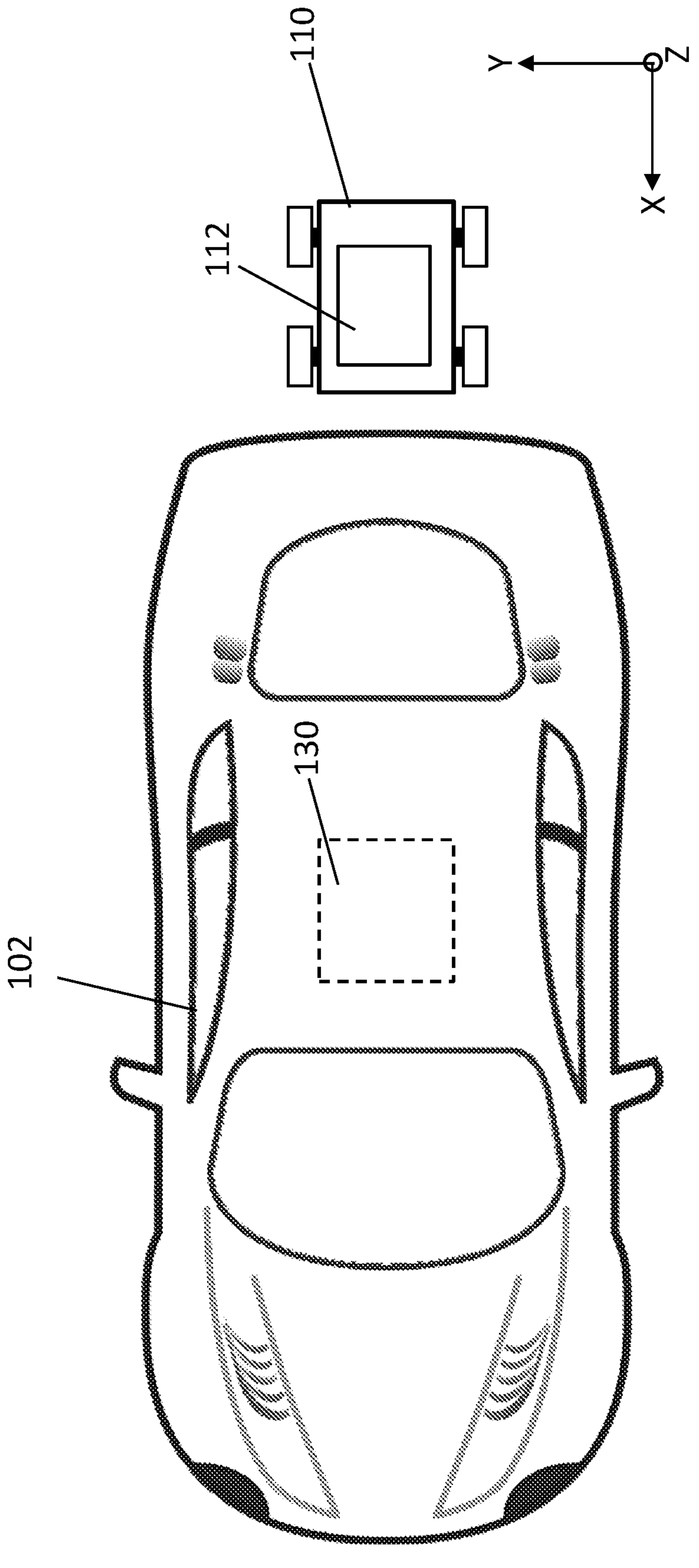
Figure 1C:
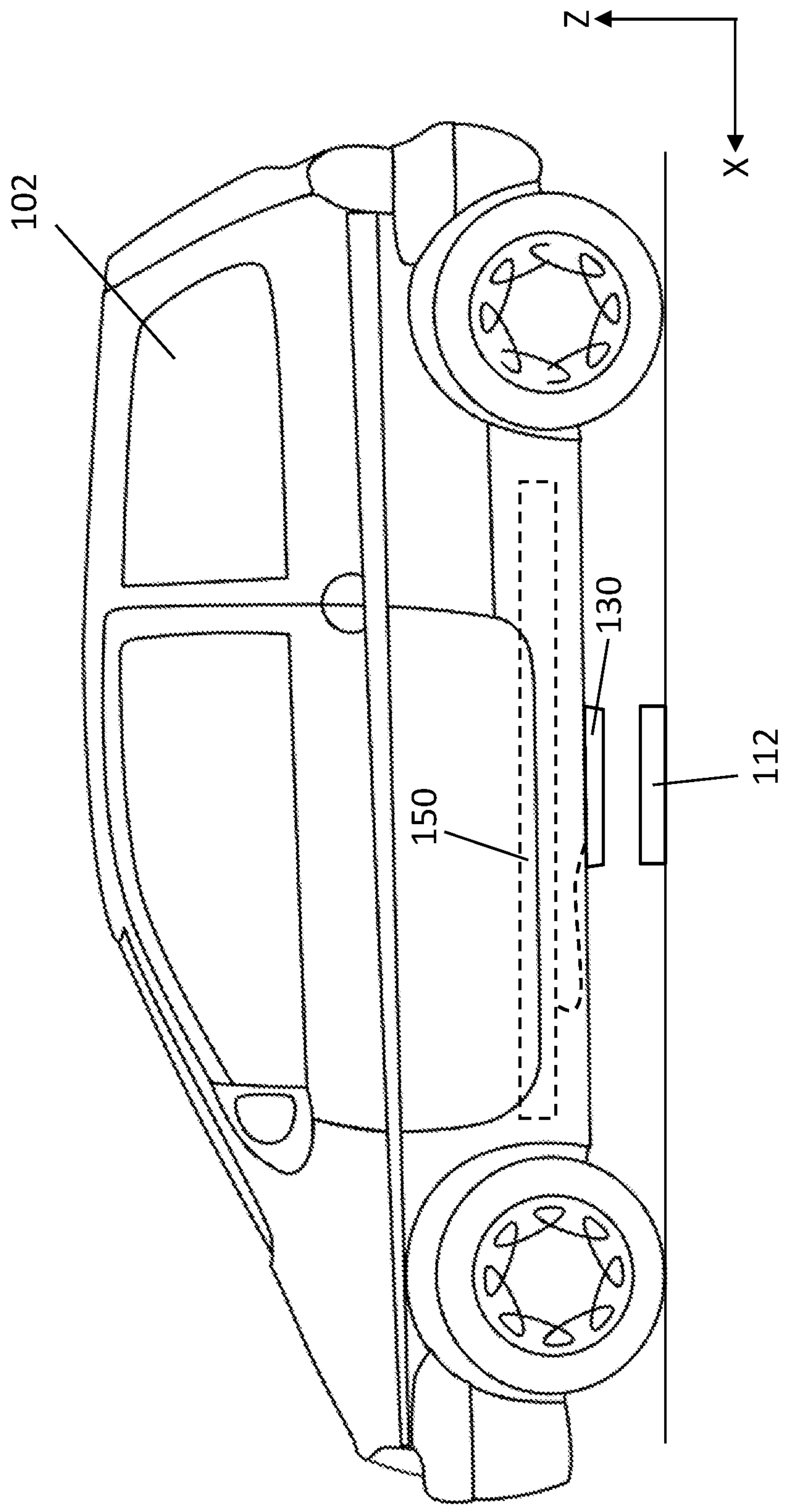

FIGS. 1A-1C are schematic drawings showing the principal components of a system 100 for charging an EV using a WPT according to some implementations. The components illustrated are described in more detail below.

FIG. 1A is a side view and FIG. 1B is a plan view of an EV 102 and mobile power unit 110, the mobile power unit having a charge transmitter 112 mounted thereon. EV 102 may include a wireless charge receiver 130 that is connected to a load 150 that may be battery mounted inside or on EV 102.

In embodiments described herein, EV 102 is stationary and mobile power unit 110 may move to the location of EV 102 for providing WPT to EV 102 via charge receiver 130. FIG. 1A shows mobile power unit 110 positioned under charge receiver 130, and FIG. 1B shows mobile power unit approaching EV 102. Alternatively, as shown in FIG. 1C, EV 102 having charge receiver 130 may move to align charge receiver 130 with charge transmitter 112 that is stationary.

Embodiments described herein may refer to movement of charge transmitter 112 mounted on mobile power unit 110 for aligning charge transmitter 112 with charge receiver 130, but it should be appreciated that these embodiments may be implemented with a charge receiver 130 mounted on EV 102 that is mobile such that charge receiver 130 is aligned with stationary charge transmitter 112 by movement of EV 102. The principal components illustrated in FIGS. 1A-1C may not be to scale.

In some embodiments, charge receiver 130 may be mounted on an underside of EV 102 and mobile power unit 110 may have a height that enables mobile power unit 110 to fit under charge receiver 130, such that the charge receiver 130 can be positioned between EV 102 and mobile power unit 110.

Once mobile power unit 110 is substantially directly beneath charge receiver 130, WPT may be performed. It should be appreciated that charge receiver 130 may be positioned on another surface of EV 102, and mobile power unit 110 may be configured for positioning opposite such an alternative surface.

The description below may make reference to the movement of mobile power unit 110 or EV 102 using the coordinate system illustrated in FIGS. 1A and 1B where the X and Y directions are in a horizontal plane and the Z direction represents vertical movement.

Embodiments described below may enable improved or optimal positioning, by movement in the X, Y and/or Z directions, of mobile power unit 110 relative to charge receiver 130 in order to provide, comparatively improved, maximum and/or most efficient power transfer from a charge transmitter of mobile power unit 110 to charge receiver 130.

Embodiments described below may enable improved or optimal positioning, by movement in the X, Y and/or Z directions, of EV 102 having charge receiver 130 mounted thereon relative to charge transmitter 112 in order to provide maximum and/or most efficient power transfer from a charge transmitter to charge receiver 130 on EV 102.

Figure 2:
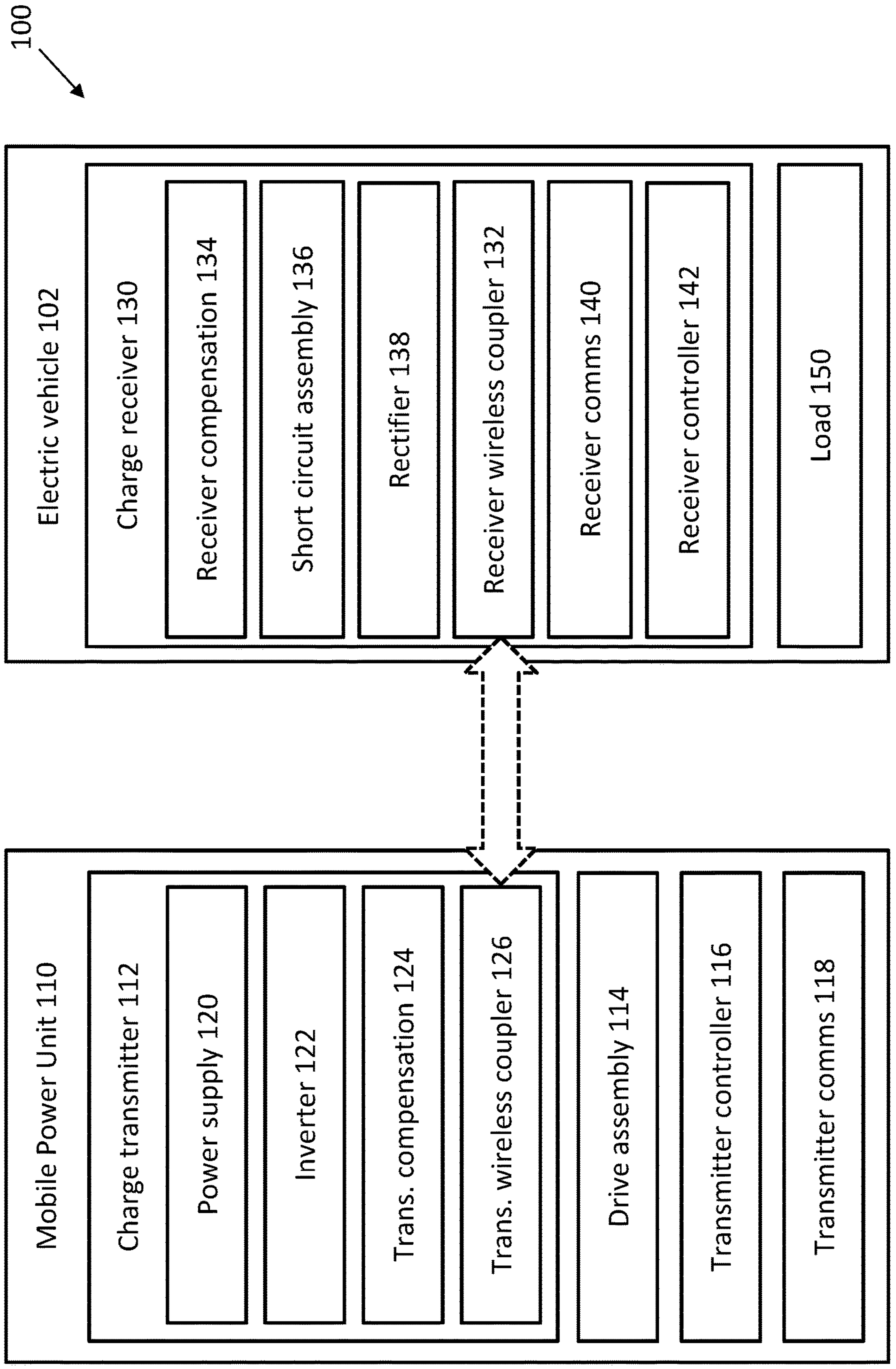
FIG. 2 is a block diagram showing the components of a system for charging an EV using a WPT and specifically for alignment of a charge transmitter and receiver according to some implementations.

FIG. 2 is a block diagram showing the components of a system 100 for charging an EV and specifically for alignment of a charge transmitter and receiver according to some implementations. As shown in FIG. 2 mobile power unit 110 may include charge transmitter 112, a drive assembly 114, a transmitter controller 116, and a transmitter communications (comms) module 118. Charge transmitter 112 may include a power supply 120, an inverter 122, a transmitter compensation (comp.) network 124, and a transmitter wireless coupler 126.

Drive assembly 114 may be configured to propel and steer mobile power unit 110. In some embodiments, drive assembly 114 may include one or more motors to rotate and steer omnidirectional wheels such as mecanum wheels.

It is noted that in some embodiments, one or more of the controllers may be implemented by at least one processor and at least one memory, the processor being configured to execute instructions stored in the at least one memory.

Transmitter controller 116 may be a computing device as defined herein. In some embodiments, transmitter controller 116 may be a programmable logic controller (PLC). Transmitter controller 116 may manage the operation of the components of mobile power unit 110 and may direct the flow of data between the components of mobile power unit 110. Where mobile power unit 110 may be said herein to provide specific functionality or perform actions or processes, it should be understood that the functionality or actions are performed by transmitter controller 116 that may perform the functionality or actions or may call on other components of mobile power unit 110 for performing functionality or actions. Transmitter controller 116 and the modules and components that are included in mobile power unit 110 may include a non-transitory computer readable medium containing instructions that when executed by at least one processor are configured to perform the functions and/or operations necessary to provide the functionality described herein. In some embodiments, transmitter controller 116 may be in data communication with one or more of the components of mobile power unit 110.

Power supply 120 may include a rechargeable power storage unit including one or more batteries, to supply energy for WPT, to supply power to other components on mobile power unit 110, and to supply energy to a drive assembly 114. Inverter 122 may convert the DC of power supply 120 to AC.

As shown in FIG. 2, EV 102 may include charge receiver 130 and load 150. It should be appreciated that EV 102 may include other systems and components not described herein that are required for operation of an EV as known in the art. Load 150 may include an EV battery and associated EV battery management systems. Charge receiver 130 may include a receiver wireless coupler 132, a receiver compensation network 134, a short circuit assembly 136, a rectifier 138, a receiver comms module 140, and a receiver controller 142.

Transmitter wireless coupler 126 and receiver wireless coupler 132 may enable WPT between charge transmitter 112 and charge receiver 130. Transmitter wireless coupler 126 and receiver wireless coupler 132 may include components, and may be configured according to the WPT technique employed in system 100. In some embodiments, the WPT technique may be inductive coupling/charging. In some embodiments, the WPT technique may be capacitive coupling/charging. For inductive coupling/charging, transmitter wireless coupler 126 and receiver wireless coupler 132 may include conducting coils (not shown). For capacitive coupling/charging, which is based on electric field coupling, transmitter wireless coupler 126 and receiver wireless coupler 132 may include, respectively, a pair of transmitting plates and a pair of receiving plates (not shown).

In some embodiments, transmitter and receiver compensating networks 124 and 134 may be provided in order to minimize the VA rating, reduce the reactive power that may negatively affect system efficiency, and to maximize the real power transfer to load 150 reflected from the receiver wireless coupler 132.

Rectifier 138 may convert the AC received from receiver wireless coupler 132 and receiver compensation network 134 to DC for use by load 150.

In some embodiments, short circuit assembly 136 may be activated to short circuit the input of rectifier 138 and deactivated to enable normal operation of rectifier 138. In some embodiments, short circuit assembly 136 is integrated into rectifier 138. In some embodiments, short circuit assembly 136 is positioned between rectifier 138 and receiver compensating network 134. Short circuiting the input of rectifier 138 results in a reflected load of 0Ω and stops power from being delivered to load 150 during a coupling measurement phase (described below) thus allowing mobile power unit 110 to adjust its position without damaging load 150. Embodiments of short circuit assembly 136 are described below with reference to FIGS. 4A-4D.

Receiver controller 142 may be a computing device as defined herein. In some embodiments, receiver controller 142 may be a programmable logic controller (PLC). Receiver controller 142 may manage the operation of the components of charge receiver 130 and may direct the flow of data between the components of charge receiver 130. Where charge receiver 130 may be said herein to provide specific functionality or perform actions or processes, it should be understood that the functionality or actions may be performed by receiver controller 142 that may perform the functionality or actions or may call on other components of charge receiver 130 for performing functionality or actions. Receiver controller 142 and the modules and components that are included in receiver controller 142 may include a non-transitory computer readable medium containing instructions that when executed by at least one processor are configured to perform the functions and/or operations necessary to provide the functionality described herein. In some embodiments, receiver controller 142 may be in data communication with one or more of the components of charge receiver 130.

In some embodiments, charge receiver 130 may be in data communication with EV 102. In some embodiments, receiver controller 142 may provide instructions to EV 102 for steering and moving EV 102 to provide improved or optimal alignment of charge receiver 130 over charge transmitter 112 that is stationary i.e.: not mounted on a mobile power unit 110.

In some embodiments, transmitter comms module 118 may be in data communications with receiver comms module 140. For example, an instruction from transmitter controller 116 to receiver controller 142 to activate short circuit assembly 136 may be sent via transmitter comms module 118 and receiver comms module 140. Comms modules 118 and 140 may make use of any suitable wireless communication protocol or standard known in the art.

Figure 3A:
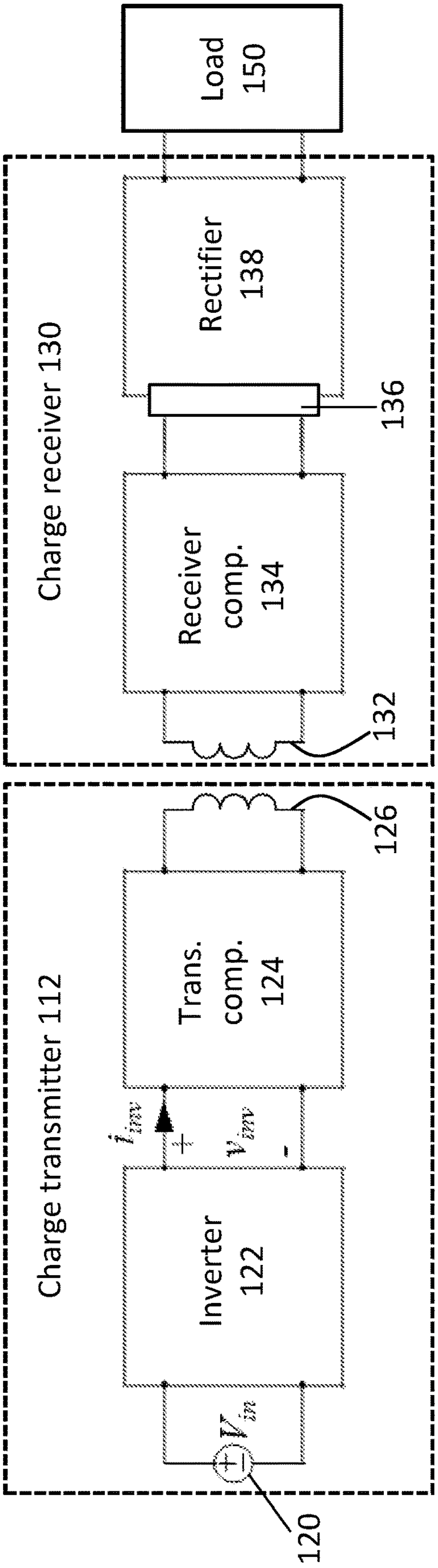
FIG. 3A is a diagram showing a simplified circuit arrangement for WPT between a charge transmitter and charge receiver according to some implementations.

FIG. 3A is a diagram showing a simplified circuit arrangement for WPT between a charge transmitter and charge receiver according to some implementations. As shown in FIG. 3A inverter 122 may convert the DC of power supply 120 to AC before it is passed through transmitter compensating network 124 and transmitter wireless coupler 126. In the charge receiver 130, the induced voltage/current at receiver wireless coupler 132 may pass through receiver compensating network 134 before being converted by rectifier 138 from AC to DC for use by load 150. In some embodiments, short circuit assembly 136 may be activated to short-circuit the input of rectifier 138 and deactivated to enable normal operation of rectifier 138.

In FIG. 3A, the inverter output voltage and current are denoted $v_{inv}$ and $i_{inv}$ respectively. In some embodiments, with the mobile power unit 110 positioned substantially beneath the charge receiver 130, the rectifier input may be short circuited by short circuit assembly 136, the inverter output current of the charge transmitter may be measured, and the measured inverter output current may then be used to determine the transmitter/receiver coupling coefficient. In some embodiments, the determination of the coupling coefficient may be performed by transmitter controller 116.

Figure 3B:
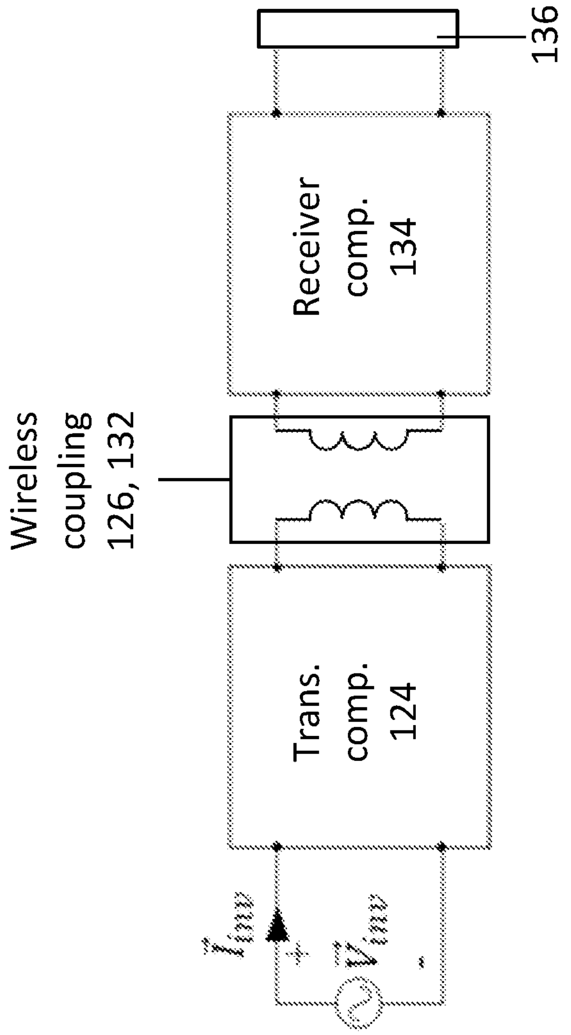
FIG. 3B is a diagram showing a fundamental harmonic approximation model of a circuit for WPT between a charge transmitter and charge receiver according to some implementations.

In some embodiments, fundamental harmonic approximation (FHA) may be utilized as a step towards determining the coupling coefficient. An FHA model of the generalized system shown in FIG. 3A (with short circuit assembly 136 activated to short the input of rectifier 138) is shown in FIG. 3B. In FIG. 3B, phasors $\vec{I}_{inv}$ and $\vec{V}_{inv}$ denote the inverter output current and voltage fundamental harmonics respectively at an operational frequency f with matching magnitudes given by $I_{inv}$ and $V_{inv}$. An inverter output impedance magnitude $Z_{inv}$ may then be obtained using:

$$Z_{inv} = \frac{V_{inv}}{I_{inv}}. \tag{1}$$

This output impedance may be found by substituting actual measurements of inverter current and voltage fundamental harmonic magnitudes $$I_{inv}^* \text{ and } V_{inv}^*$$

into equation (1) or determined when all the system parameters (including a coupling coefficient and load) are known. Therefore, in cases when the coupling coefficient k is unknown it is possible to identify the coupling coefficient k by equating the measured inverter impedance $Z_{inv}$ to its analytical value and solving for the coupling coefficient. Short circuiting the receiving side rectifier input (such as with short circuit assembly 136) removes the dependency of $Z_{inv}$ on load 150 (which is 0Ω in the shorted state) resulting in the coupling coefficient k being dependent only on system parameters (which are known or may be measured):

$$\frac{V_{inv}^*}{I_{inv}^*} = f(k). \tag{2}$$

In order to determine the coupling coefficient k, equation (2) may be reordered, and the coupling coefficient k may be determined using equation (3) as follows:

$$k = f^{-1}\left(\frac{V_{inv}^*}{I_{inv}^*}\right). \tag{3}$$

In some embodiments, where the DC input voltage $V_{in}$ and phase shift angle α are known the voltage fundamental harmonic $$V_{inv}^*$$

may be calculated using equation (4) thus eliminating the need for measuring the inverter output voltage fundamental harmonic magnitude. Thus only $I_{inv}$ needs to be measured to determine k.

$$V_{inv} = \frac{4}{\pi} V_{in} \cos\left(\frac{\alpha}{2}\right). \tag{4}$$

Thus, the coupling coefficient k may be determined from parameters that may be measured within charge transmitter 112 after activating short circuit assembly 136 to short circuit the input of rectifier 138. The determined coupling coefficient may be used to determine whether charge transmitter 112 on mobile power (also: charging) unit 110 is at an improved or optimal position opposite charge receiver 130 such as in processes 500 and 600 described below.

In some embodiments, when $V_{inv}$ is kept constant during the position improvement or optimization process (processes 500 and 600), determination of k according to equation (3) may be summarized in a look-up table mapping $I_{inv}$ directly to k. Once such a look up table has been defined, $I_{inv}$ values may be used directly for position improving and/or optimization (without determining k after each incremental movement of mobile power unit 110).

In some embodiments, the fundamental harmonic magnitude $$I_{inv}^*$$

may be determined by measurement of an inverter current that is then passed through a band pass filter (not shown) tuned to an operational frequency f in order to isolate the fundamental harmonic, and then passing the resulting waveform through a magnitude detector (not shown).

Figure 4B:
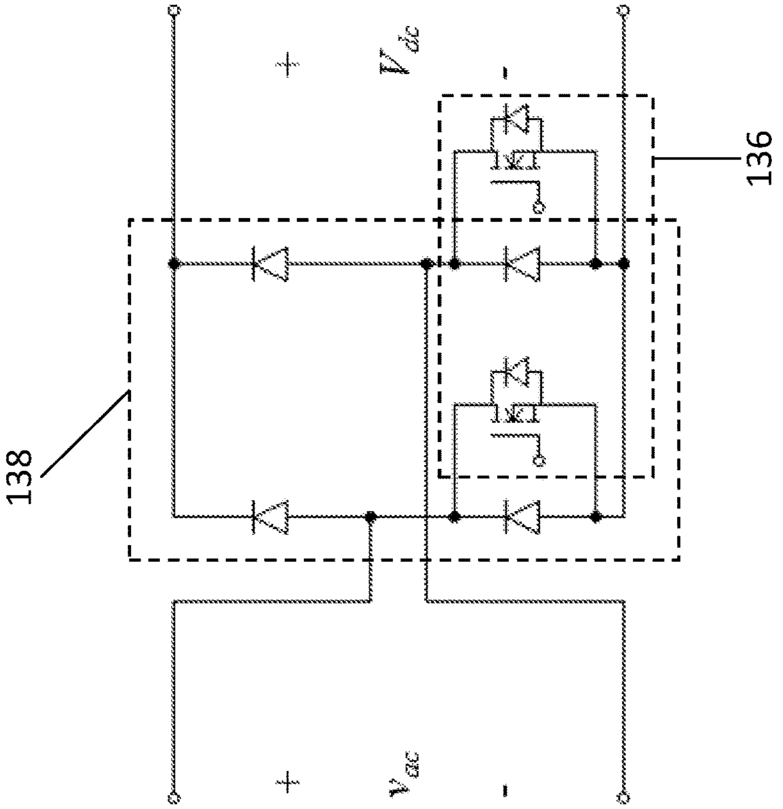
FIGS. 4A-4D are circuit diagrams of rectifiers with integrated short circuit assemblies according to some implementations.
Figure 4A:
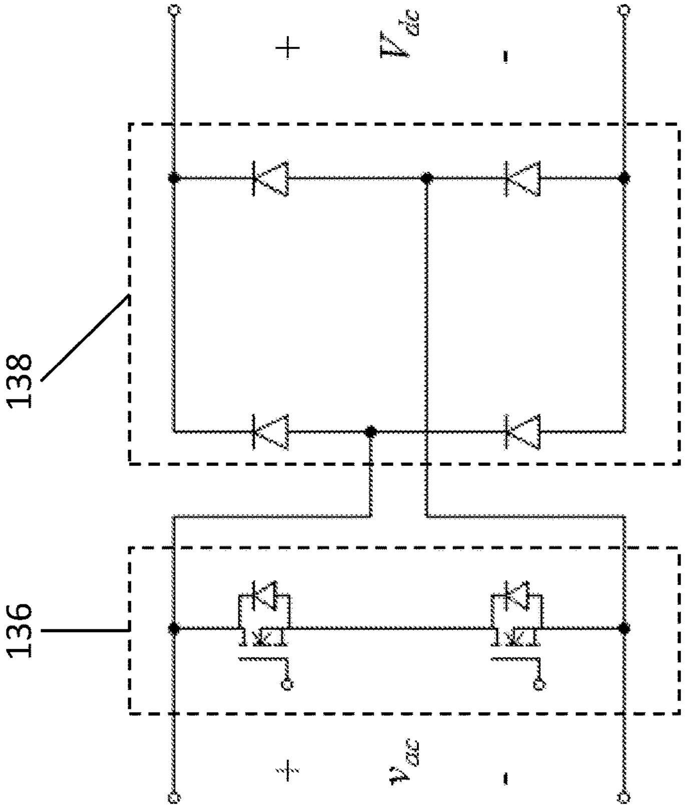
Figure 4C:
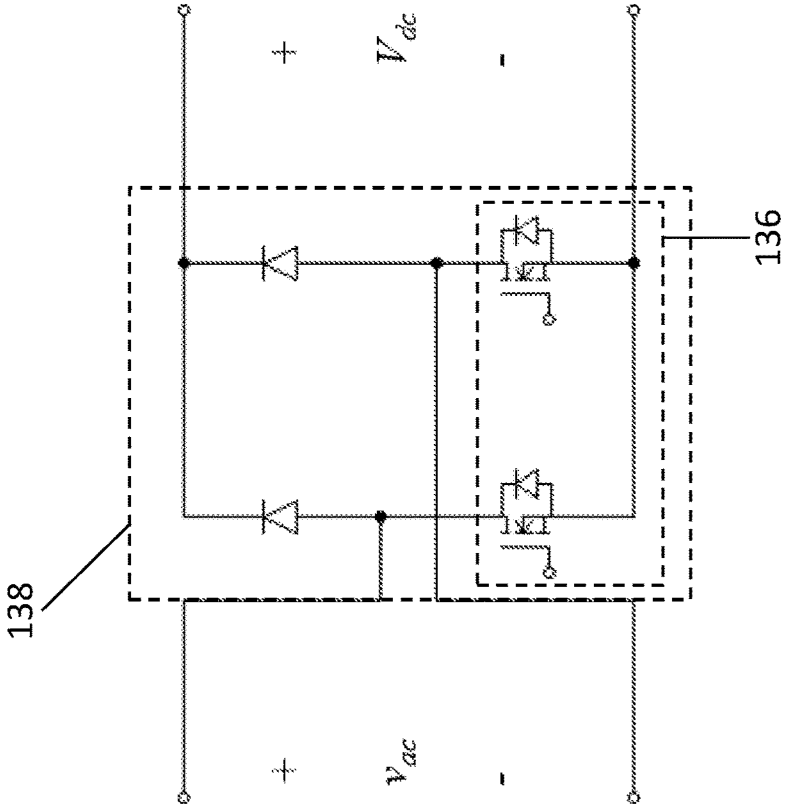
Figure 4D:
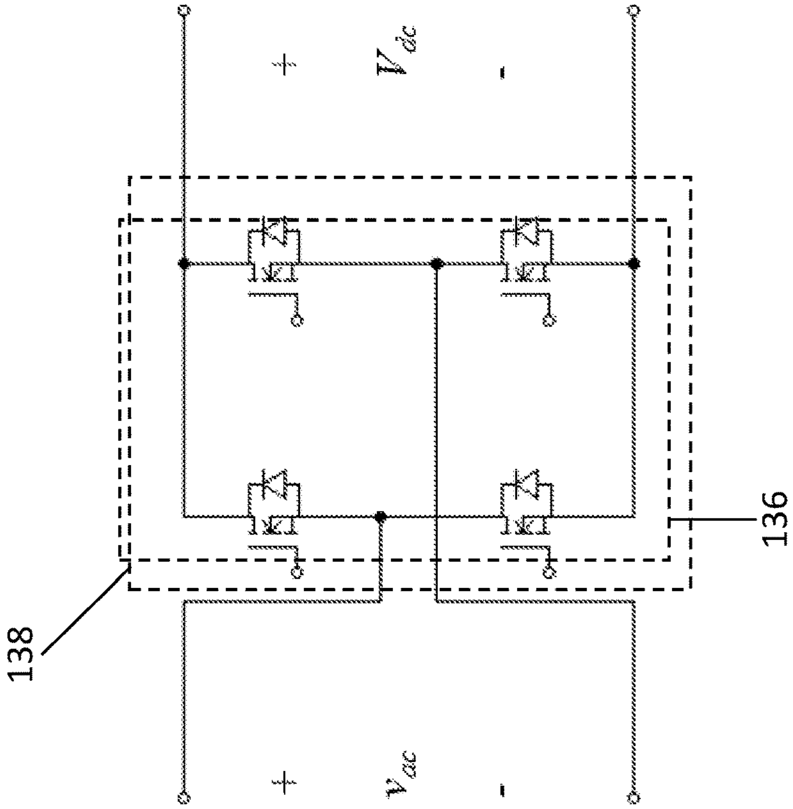

FIGS. 4A-4D are circuit diagrams of rectifiers with integrated short circuit assemblies according to some implementations. The arrangement of short circuit assembly 136 depends on the specific rectifier 138 topology utilized. In some embodiments, short circuit assembly 136 is integrated into rectifier 138 (FIGS. 4B-4D). In some embodiments, short circuit assembly 136 is positioned between rectifier 138 and receiver compensating network 134 (FIG. 4A). Short circuit assembly 136 is in data communication with receiver controller 142 that may activate or deactivate short circuit assembly 136.

In some embodiments, such as shown in FIG. 4A, a passive full bridge rectifier 138 including 4 diodes may include a bi-directional short circuit assembly 136 having a pair of transistors.

In some embodiments, such as shown in FIG. 4B, a passive full bridge rectifier 138 including 4 diodes may include a short circuit assembly 136 having two added transistors in parallel to both lower diodes. Such an arrangement may simplify transistor drive.

In some embodiments, such as shown in FIG. 4C, a semi active rectifier 138 including two diodes and two transistors may directly utilize existing transistors as short circuit assembly 136.

In some embodiments, such as shown in FIG. 4C, an active rectifier 138 including 4 transistors may utilize existing lower or higher transistor pair as a short circuit assembly 136.

In some embodiments, when determining improved or optimal positioning for mobile power unit 110, an instruction may be issued by transmitter controller 116 to receiver controller 142 to activate short circuit assembly 136, and receiver controller 142 (in communication with short circuit assembly 136) may activate short circuit assembly 136 to thereby short rectifier 138. Short circuit assembly 136 may be similarly deactivated.

Figure 5:
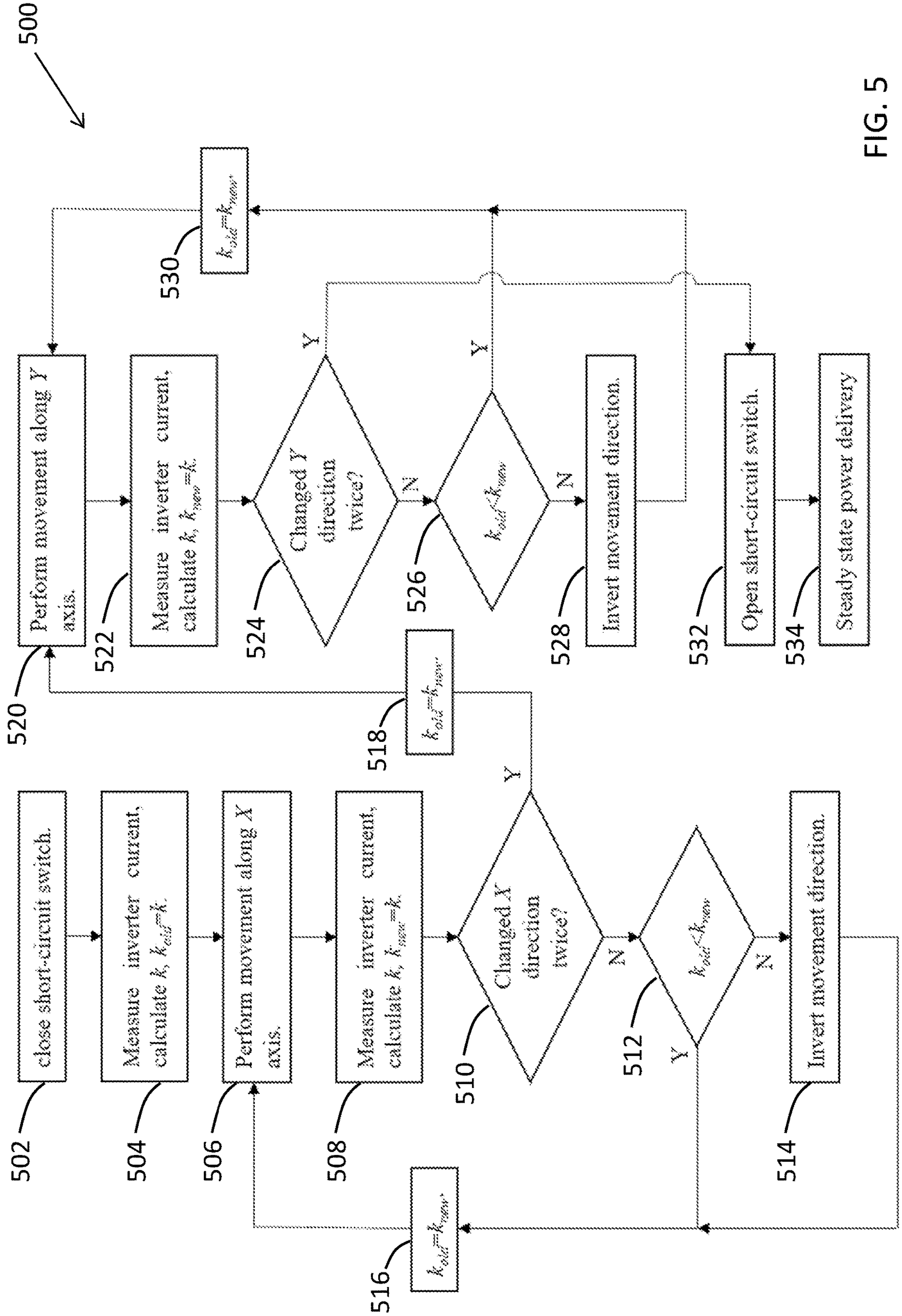
FIG. 5 shows a flowchart of a process for improving or optimizing alignment of a charge transmitter and receiver according to some implementations.

FIG. 5 shows a flowchart of a process 500 for improved and/or optimal alignment of a charge transmitter and receiver according to some implementations. Process 500 may be performed by system 100 as described above. A non-transitory computer readable medium may contain instructions that when executed by at least one processor, performs the operations described at each of the steps in process 500. The transitory and/or non-transitory computer readable medium and at least one processor may correspond to controllers 116 and 142 and/or other components of system 100. The coordinate system (X, Y, Z) referred to below is illustrated in FIGS. 1A and 1B.

In some embodiments, following activation of short circuit assembly 136, process 500 may include an iterative process of incrementally shifting the position of mobile power unit 110 relative to charge receiver 130 in X and Y directions while determining whether the position shift improves or worsens the coupling coefficient, until a desirable improved or optimal position of the mobile power unit having substantially optimal coupling coefficient is found, and the charge transmitter and receiver may be said to be in optimal alignment for maximum and/or most efficient power transfer.

In some embodiments, following activation of short circuit assembly 136, process 500 may include an iterative process of incrementally shifting the position of EV 102 having charge receiver 130 mounted thereon in X and Y directions while determining whether the position shift improves or worsens the coupling coefficient between a stationary charge transmitter 112 and charge receiver 130, until a desirable improved or optimal position having substantially an optimal coupling coefficient is found, and the charge transmitter and receiver may be said to be in optimal alignment for maximum and/or most efficient power transfer.

In some embodiments, the position shift may be an angular position shift (e.g., tilt, yaw, or roll). Having achieved improved or optimal alignment, short circuit assembly 136 may be deactivated and energy transfer between charge transmitter 112 and charge receiver 130 may commence.

In a preliminary step, mobile power unit 110 may be positioned substantially aligned with charge receiver 130 such as, in some embodiments, by moving mobile power unit 110 to a preprogrammed "baseline" position in a specific parking spot thus aligning charge transmitter 112 substantially or significantly (but not optimally) with charge receiver 130.

In some embodiments, mobile power unit 110 may utilize low-end sensors to position itself relative to the wheels of EV 102 in a "ready to charge" position, once again attaining substantial but not optimal alignment of charge transmitter 112 and charge receiver 130.

In step 502, short circuit assembly 136 may be activated to short rectifier 138. In step 504, inverter current $I_{inv}$ may be measured and the coupling coefficient $k_{old}$ may be determined such as by using the methods and equations described with reference to FIGS. 3A and 3B.

In step 506, mobile power unit 110 may be moved a small distance in an X direction and then stop. In step 508, inverter current $I_{inv}$ may be measured and the coupling coefficient $k_{new}$ may be determined. In decision step 510, it may be determined whether process 500 has resulted in a twice change of movement in an X direction by mobile power unit 110.

If the result of decision step 510 is no, then, in decision step 512, $k_{old}$ may be compared to $k_{new}$. If $k_{new}$ is greater than $k_{old}$, i.e.: the coupling coefficient k has improved due to the X movement of step 506, then, in step 516, $k_{new}$ is designated as $k_{old}$ and steps 506-512 may be repeated.

If, in decision step 512, if $k_{new}$ is determined to be less than $k_{old}$, i.e.: the coupling coefficient k has deteriorated, then, in step 514, the direction of movement of mobile power unit 110 in a X direction (step 506) may be reversed. In step 516, $k_{new}$ may be designated as $k_{old}$ and steps 506-512 may be repeated.

If the result of decision step 510 is yes, i.e.: the direction of movement of mobile power unit 110 in a X direction (step 506) has been changed twice, then process 500 may terminate the process of steps 506-516 having found an improved or optimal position of mobile power unit 110 where charge transmitter 112 and charge receiver 130 are aligned in the X direction, and may proceed with step 518. In step 518, $k_{new}$ may be designated as $k_{old}$.

In step 520, mobile power unit 110 may be moved a small distance in an Y direction and then stop. In step 522, inverter current $I_{inv}$ may be measured and the coupling coefficient $k_{new}$ may be determined. In decision step 524, it may be determined whether process 500 has resulted in a twice change of movement in an Y direction by mobile power unit 110.

If the result of decision step 524 is no, then, in decision step 526, $k_{old}$ may be compared to $k_{new}$. If $k_{new}$ is greater than $k_{old}$, i.e.: the coupling coefficient k has improved due to the Y movement of step 520, then, in step 530, $k_{new}$ is designated as $k_{old}$ and steps 520-526 may be repeated.

If, in decision step 526, $k_{new}$ is determined to be less than $k_{old}$, i.e.: the coupling coefficient k has deteriorated, then, in step 528, the direction of movement of mobile power unit 110 in a Y direction (step 520) may be reversed. In step 530, $k_{new}$ may be designated as $k_{old}$ and steps 520-526 may be repeated.

If the result of decision step 524 is yes, i.e.: the direction of movement of mobile power unit 110 in a Y direction (step 520) has been changed twice, then process 500 may terminate the process of steps 520-530 for finding an improved or optimal position where charge transmitter 112 and charge receiver 130 are aligned in the Y direction. Having found an improved or optimal position for mobile power unit 110 in both of the X and Y directions, process 500 may continue with step 532.

In step 532, short circuit assembly 136 may be deactivated such that rectifier 138 is no longer shorted. In step 534, system 100 may operate in a "steady state" where WPT may take place between charge transmitter 112 and charge receiver 130 where the improved or optimal alignment, e.g., in the X and/or Y directions ensures correspondingly improved or maximum and/or most efficient power transfer.

Figure 6A:
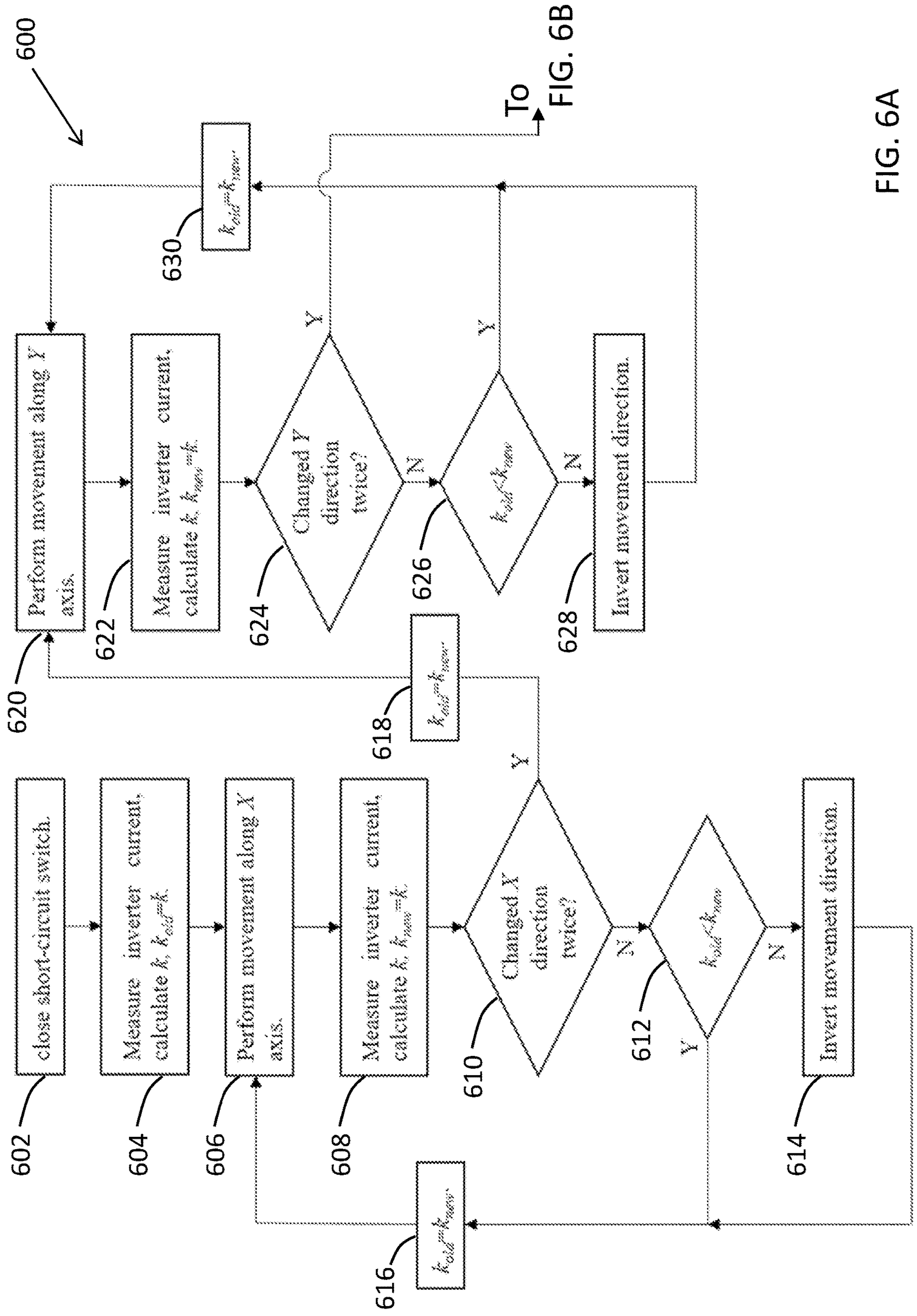
FIGS. 6A and 6B show a flowchart of a process for improved or optimal alignment of a charge transmitter and receiver according to some implementations.
Figure 6B:
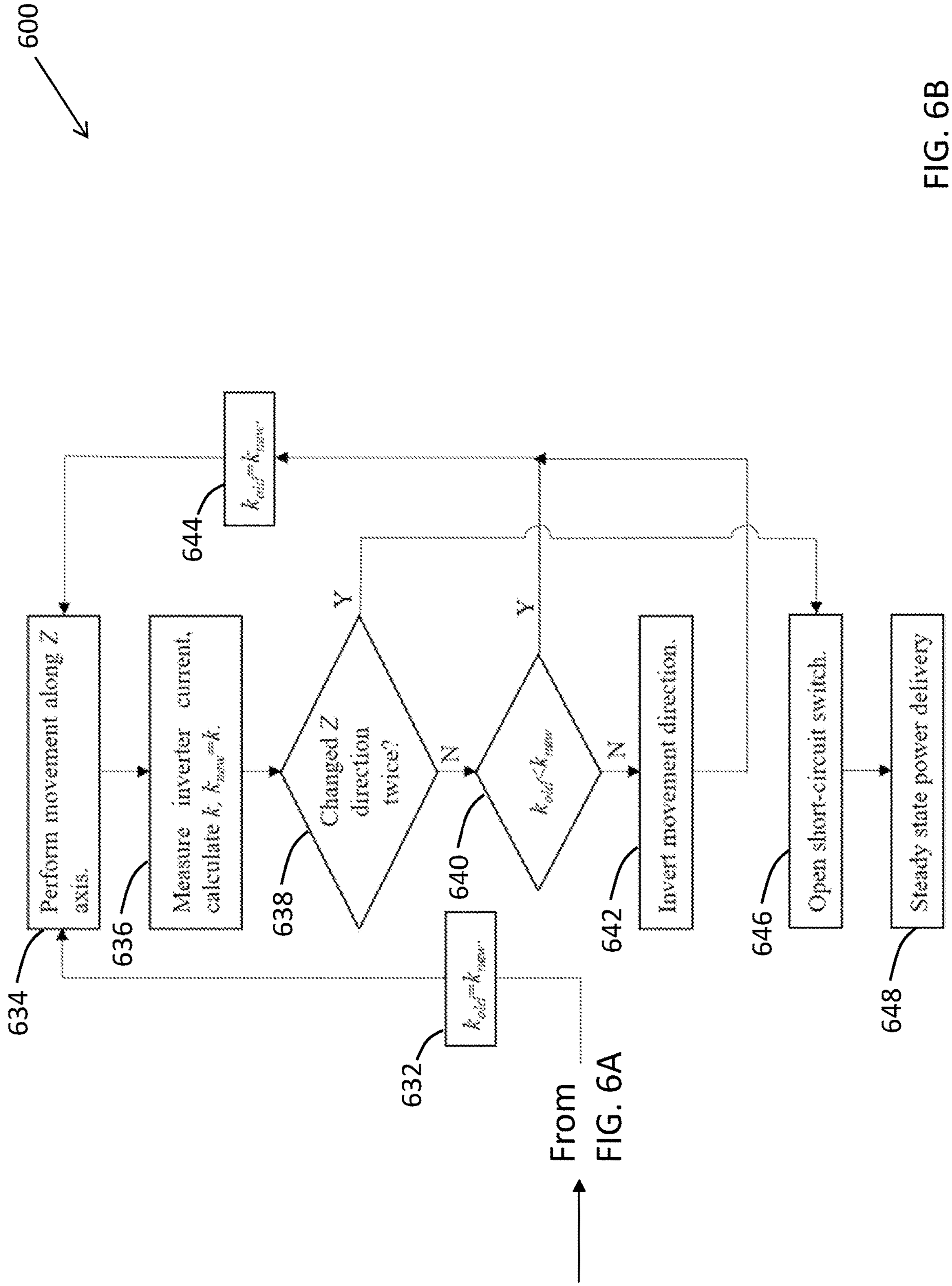

FIGS. 6A and 6B show a flowchart of a process 600 for improved or optimal alignment of a charge transmitter and receiver according to some implementations. Process 600 may be performed by system 100 as described above. A non-transitory computer readable medium may contain instructions that when executed by at least one processor performs the operations described at each of the steps in process 600. The non-transitory computer readable medium and at least one processor may correspond to controllers 116 and 142 and/or other components of system 100. The coordinate system (X, Y, Z) referred to below is illustrated in FIGS. 1A and 1B.

In some embodiments, following activation of short circuit assembly 136, process 600 may include an iterative process of incrementally shifting the position of mobile power unit 110 relative to charge receiver 130 in X, Y, and/or Z directions while determining whether the position shift improves or worsens the coupling coefficient, until the improved or optimal position of the mobile power unit having substantially the maximum coupling coefficient is found, and the charge transmitter and receiver may be said to be in improved or optimal alignment for maximum energy transfer.

In some embodiments, the position shift may be an angular position shift. In some embodiments, following activation of short circuit assembly 136, process 600 may include an iterative process of incrementally shifting the position of EV 102 having charge receiver 130 mounted thereon in X, Y, and/or Z directions while determining whether the position shift improves or worsens the coupling coefficient between a stationary charge transmitter 112 and charge receiver 130, until a desirable improved or optimal position having substantially an optimal coupling coefficient is found, and the charge transmitter and receiver may be said to be in correspondingly improved, or optimal alignment for improved, maximum or most efficient power transfer.

Having achieved desired improved or optimal alignment, short circuit assembly 136 may be deactivated and energy transfer between charge transmitter 112 and receiver 130 may commence.

In a preliminary step, mobile power unit 110 may be positioned substantially aligned with charge receiver 130 such as, in some embodiments, by moving mobile power unit 110 to a preprogrammed "baseline" position in a specific parking spot thus aligning charge transmitter 112 substantially (but not optimally) with charge receiver 130. In some embodiments, mobile power unit 110 may utilize low-end sensors to position itself relative to the wheels of EV 102 in a "ready to charge" position, once again attaining substantial but not optimal alignment of charge transmitter 112 and charge receiver 130.

Steps 602-630 are the same as steps 502-530 as described above with reference to FIG. 5 and may find improved or optimal positioning of mobile power unit 110 in X and Y directions.

If the result of decision step 624 is yes, i.e.: the direction of movement of mobile power unit 110 in a Y direction (step 620) has been changed twice, then process 600 may terminate the process of steps 620-630 for finding an improved or optimal position where charge transmitter 112 and charge receiver 130 are aligned in the Y direction.

In step 632, $k_{new}$ may be designated as $k_{old}$. In step 634, mobile power unit 110 may be moved a small distance in a Z direction (by raising or lowering a height of mobile power unit 110 for approach or move away the power unit from the charge receiver) and then stop. In step 636, inverter current $I_{inv}$ may be measured and the coupling coefficient $k_{new}$ may be determined. In decision step 638, it may be determined whether process 600 has resulted in a twice change of movement in a Z direction by mobile power unit 110.

If the result of decision step 510 is no, then, in decision step 640, $k_{old}$ may be compared to $k_{new}$. If $k_{new}$ is greater than $k_{old}$, i.e.: the coupling coefficient k has improved due to the Z movement of step 634, then, in step 644, $k_{new}$ is designated as $k_{old}$ and steps 634-640 may be repeated.

If, in decision step 640, $k_{new}$ is determined to be less than $k_{old}$, i.e.: the coupling coefficient k has deteriorated, then, in step 642, the direction of movement of mobile power unit 110 in a Z direction (step 634) may be reversed. In step 644, $k_{new}$ may be designated as $k_{old}$ and steps 634-640 may be repeated.

If the result of decision step 638 is yes, i.e.: the direction of movement of mobile power unit 110 in a Z direction (step 634) has been changed twice, then process 600 may terminate the process of steps 634-642 having found an improved or optimal position of mobile power unit 110 where charge transmitter 112 and charge receiver 130 are aligned in the Z direction.

Having found an improved or optimal position for mobile power unit 110 in all of the X, Y and Z directions, process 600 may continue with step 646. In step 646, short circuit assembly 136 may be deactivated such that rectifier 138 is no longer shorted. In step 648, system 100 may operate in a "steady state" where WPT may take place between charge transmitter 112 and charge receiver 130 where the improved or optimal alignment in the X, Y and Z directions ensures correspondingly improved or maximum and/or most efficient power transfer.

Figure 7:
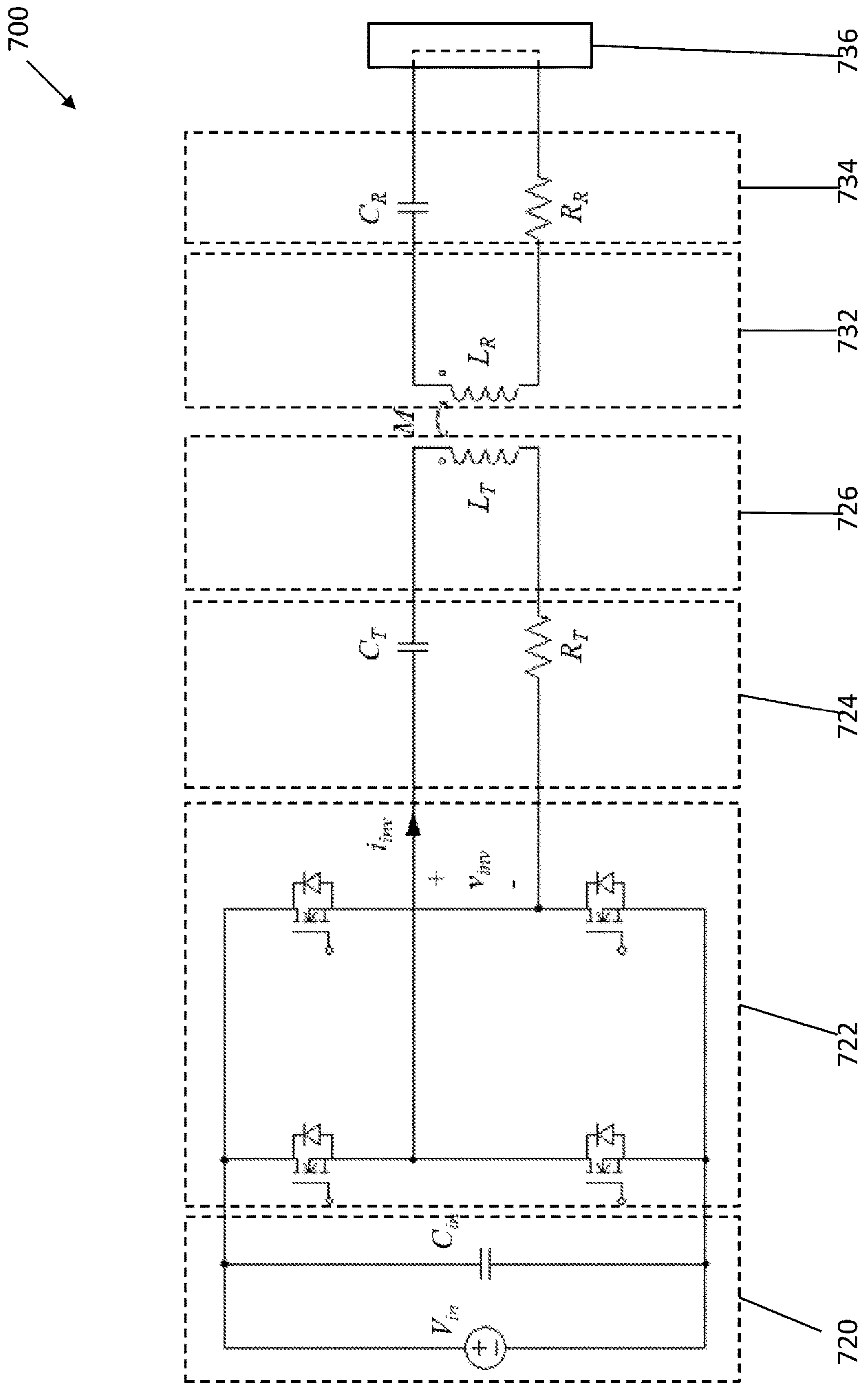
FIG. 7 is a circuit diagram of an example WPT system according to some implementations.

FIG. 7 is a circuit diagram of an example WPT system according to some implementations. In some embodiments, WPT system 700 may include the components of system 100 such as charge transmitter 112 and charge receiver 130 and may include series-series compensation as shown.

As shown in FIG. 7 inverter 722 may convert the DC of power supply 720 to AC before it is passed through transmitter compensating network 724 and transmitter wireless coupler 726. In the charge receiver 730, the induced voltage/current at receiver wireless coupler 732 may pass through receiver compensating network 734 before being converted by rectifier (not shown) from AC to DC for use by load (not shown). In some embodiments, short circuit assembly 736 may be activated to short the input of the rectifier and deactivated to enable normal operation of the rectifier.

In some embodiments, charge transmitter wireless coupler 726 may be driven by a full bridge inverter 722 fed by DC voltage source 720 $V_{in}$ with filter capacitor $C_{in}$. In some embodiments, such as shown in FIG. 7, short circuit assembly 736 may be activated to short-circuit the input of a charge receiver rectifier (not shown since it is shorted). In FIG. 7, transmitter side inductance is denoted as $L_T$ with matching compensation capacitance $C_T$. Similarly, receiver side inductance is denoted as $L_R$ with matching compensation capacitance $C_R$.

Omitting the equivalent series resistances (ESR) $R_T$ and $R_R$ for simplicity, the transmitter and receiver side reactances (at angular frequency ω) are given respectively by:

$$X_T = \omega L_T - \frac{1}{\omega C_T},\ X_R = \omega L_R - \frac{1}{\omega C_R}. \tag{5}$$

The inverter output impedance magnitude may then be calculated by equation 6:

$$Z_{inv} = X_T - \frac{\omega^2 M^2}{X_R} \tag{6}$$

with M denoting mutual inductance and being dependent on coupling coefficient k as defined in equation (7):

$$M = k\sqrt{L_T L_R}. \tag{7}$$

Having a constant input DC voltage and a zero inverter phase shift yields:

$$V_{inv} = \frac{4V_{in}}{\pi} = const \tag{8}$$

such that the measured inverter impedance $$Z_{inv}^*$$

varies with current as follows:

$$Z_{inv}^* = \frac{V_{inv}}{I_{inv}^*}. \tag{9}$$

Equating equations (6) to (9) and solving for k results in $$k = \sqrt{\left|\frac{X_R\left(X_T - \frac{V_{inv}}{I_{inv}^*}\right)}{\omega^2 L_T L_R}\right|} \tag{10}$$

which allows for coupling coefficient determination by measuring $$I_{inv}^*$$

alone (other parameters are known).

When the system resonant frequency $$\omega_0 = \frac{1}{\sqrt{L_T C_T}} = \frac{1}{\sqrt{L_R C_R}}, \tag{11}$$

is substituted into equation (5), the resulting reactances equal 0 and the behavior of system 700 will be dominated by the equivalent ESRs. Thus, in order for equation (10) to be valid, system 700 must be operated at a frequency such that $$X_T, X_R >> R_T, R_R. \tag{12}$$

Consider an example system 700 with parameters as provided in Table 1.

TABLE 1

Example system 700 parameters

| Parameter | Value | Units |
|---|---|---|
| $L_T$ | 200 | μH |
| $L_R$ | 180 | μH |
| $C_T$ | 15 | nF |
| $C_R$ | 16.6 | nF |
| $R_T$ | 0.2 | Ω |
| $R_R$ | 0.2 | Ω |
| $\omega_0$ | 2π · 92 | krad/sec |
| ω | 2π · 184 | krad/sec |
| $V_{in}$ | 100 | V |

In order to comply with (12), the operational frequency ω used for the coupling coefficient identification is chosen as twice the resonant frequency $\omega_0$. The coupling coefficient of system 700 may be varied in this simulation between 0.1 and 0.7, and the fundamental harmonic magnitude of the inverter current may be measured for each case and substituted into equation (10) along with the parameters in Table 1 to calculate the coupling coefficient.

Figure 8:
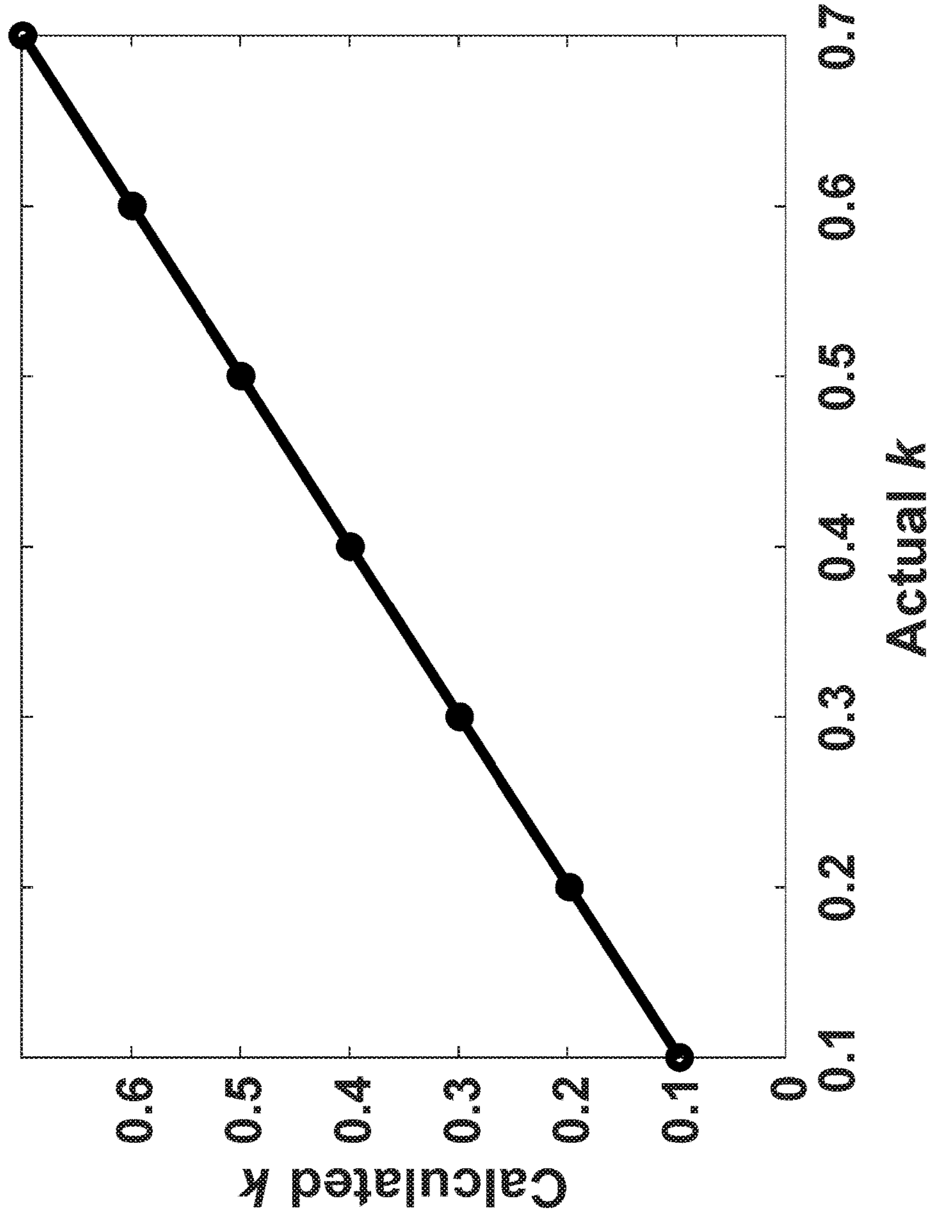
FIG. 8 is a graph showing the calculated coupling coefficient as a function of the actual coupling coefficient for the system, according to some implementations.

FIG. 8 is a graph 800 showing the calculated coupling coefficient as a function of the actual coupling coefficient for system 700 according to some implementations. FIG. 8 shows clear matching between the calculated and actual values of k.

Figure 9:
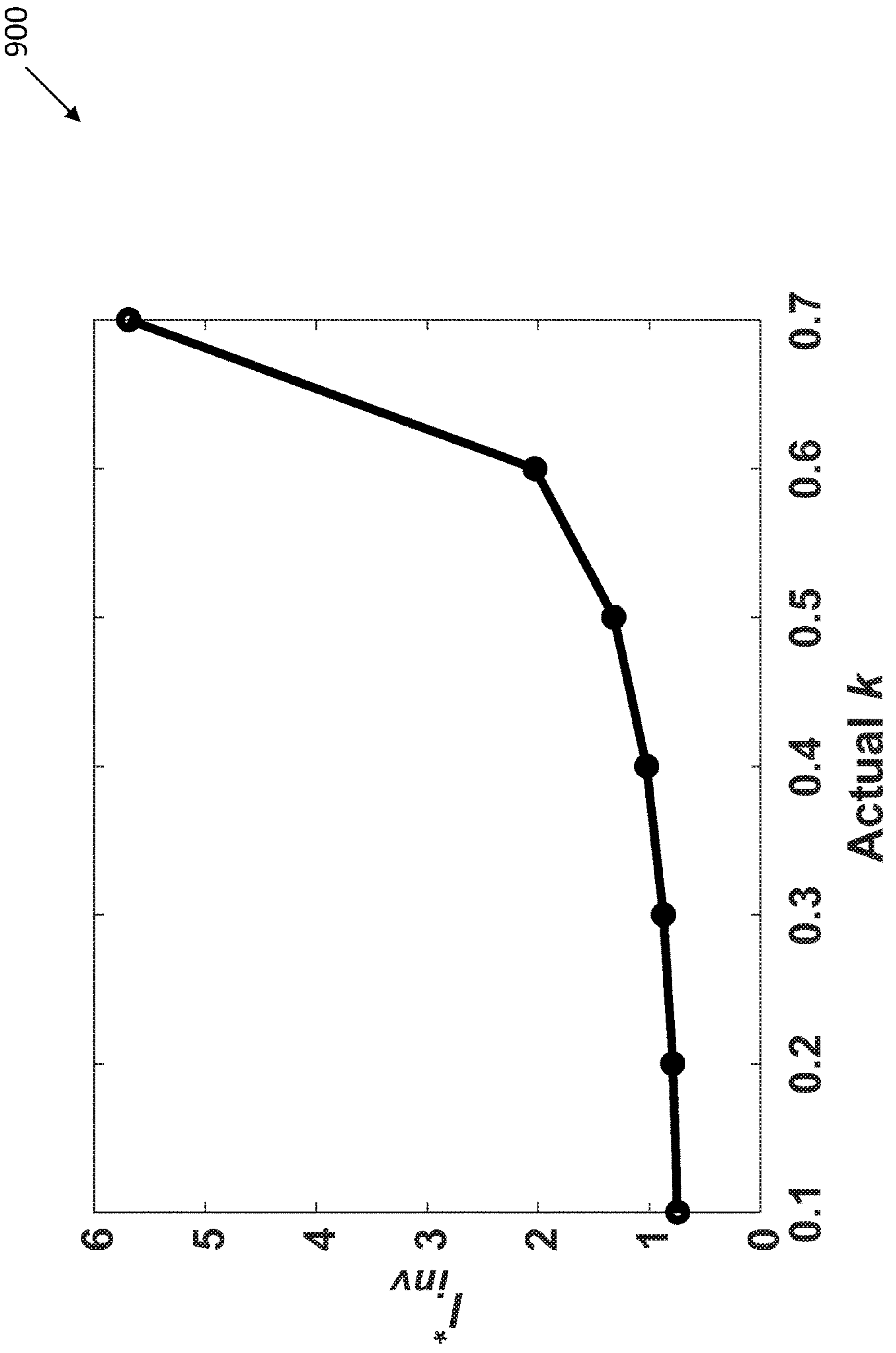
FIG. 9 is a graph showing the measured fundamental harmonic magnitude of the inverter current as a function of the actual coupling coefficient for system 700 according to some implementations.

FIG. 9 is a graph 900 showing the measured fundamental harmonic magnitude of the inverter current as a function of the actual coupling coefficient for system 700 according to some implementations. As shown in FIG. 9 Since $$I_{inv}^*$$

changes monotonously, rising with a rise in the coupling coefficient, the $$I_{inv}^*$$

value can also be used to improve or optimize the alignment of charge transmitter and receiver in system 100 or 700—either by finding the point of maximum inverter current with a corresponding maximum coupling coefficient using processes 500 or 600, or by identifying the inverter current value that corresponds to a desired coupling coefficient and using processes 500 or 600 until the desired inverter current is achieved.

Additional Examples

Example 1 pertains to a wireless power transmission (WPT) system comprising:

a charge transmitter;

a charge receiver configured to receive wireless power from the charge transmitter, wherein the charge receiver includes a short circuit assembly configured, when activated, to short circuit a rectifier of the charge receiver; and a controller configured to activate the short circuit assembly, and to determine based on an inverter output current of the charge transmitter that an improved or optimal alignment between the charge transmitter and charge receiver has been achieved.

Example 2 includes the subject matter of example 1 and, optionally, wherein the controller is configured to determine a coupling coefficient based on the inverter output current.

Example 3 includes the subject matter of example 2 and, optionally, wherein the coupling coefficient is further determined based on a DC input voltage and phase shift angle of the charge transmitter.

Example 4 includes the subject matter of any one or more of the examples 1 to and, optionally, wherein the determining that an optimal alignment has been achieved includes an iterative process of incrementally shifting a position of the charge transmitter relative to the charge receiver or vice versa while determining whether a position shift improves or worsens the coupling coefficient, until an optimal position of the charge transmitter relative to the charge receiver corresponding to the optimal alignment having an optimal coupling coefficient is found.

Example 5 includes the subject matter of example 4 and, optionally, wherein the incrementally shifting the position of the charge transmitter or charge receiver is performed in X, Y and Z directions and/or by rotation about X, Y and Z.

Example 6 includes the subject matte of any one or more of the examples 1 to 5 and, optionally, wherein the controller is further configured to deactivate the short circuit assembly and initiate energy transfer between the charge transmitter and charge receiver when the optimal alignment is achieved.

Example 7 includes the subject matter of any one or more of the examples 1 to 6 and, optionally, wherein the charge receiver may be mounted on an electric vehicle (EV) and be configured to transfer power to a load on the EV.

Example 8 includes the subject matter of any one or more of the Examples 1 to 7 and, optionally, wherein the charge receiver may be mounted on a mobile power unit, and wherein the mobile power unit includes a drive assembly configured to propel and steer the mobile power unit.

Example 9 includes the subject matter of any one or more of the examples 1 to 8 and, optionally, wherein the charge transmitter includes a transmitter wireless coupler and the charge receiver includes a receiver wireless coupler.

Example 10 includes the subject matter of any one or more of the examples 1 to 9 and, optionally, wherein a WPT technique includes inductive coupling/charging.

Example 11 includes the subject matter of any one or more of the examples 1 to 10 and, optionally, wherein a WPT technique is capacitive coupling/charging.

Example 12 includes the subject matter of any one or more of the examples 1 to 11 and, optionally, wherein the short circuit assembly is integrated into the rectifier.

Example 13 includes the subject matter of any one or more of the examples 1 to 12 and, optionally, wherein the charge receiver includes a receiver compensating network, and wherein the short circuit assembly is positioned between the rectifier and the receiver compensating network.

Example 14 includes the subject matter of any one or more of the examples 1 to 13 and, optionally, wherein the charge transmitter includes a transmitter comms module and the charge receiver includes a receiver comms module, and wherein the transmitter comms module may be in data communications with receiver comms module.

Example 15 includes the subject matter of any one or more of the examples 1 to 14 and, optionally, wherein the rectifier is a passive full bridge rectifier including, e.g., 4 diodes, and wherein the short circuit assembly includes a pair of transistors positioned between the rectifier and the receiver compensating network.

Example 16 includes the subject matter of any one or more of the examples 1 to 15 and, optionally, wherein the rectifier is a passive full bridge rectifier including, e.g., 4 diodes, and wherein the short circuit assembly includes two transistors in parallel to two lower diodes of the rectifier.

Example 17 includes any one or more of the examples 1 to 16 and, optionally, wherein the rectifier is a semi active rectifier including two diodes and two transistors, and wherein the two transistors function as the short circuit assembly.

Example 18 includes the subject matter of any one or more of the examples 1 to 17 and, optionally, wherein the rectifier is an active rectifier including, e.g., 4 rectifier transistors, and wherein a top or bottom pair of the 4 rectifier transistors functions as the short circuit assembly.

Example 19 pertains to a method comprising:

providing a wireless power transfer system including a controller, a charge transmitter and a charge receiver, wherein the charge receiver is configured to receive wireless power from the charge transmitter, and wherein the charge receiver includes a short circuit assembly configured, when activated, to short circuit a rectifier of the charge receiver;

by the controller, activating the short circuit assembly;

measuring an inverter output current of the charge transmitter; and determining based on the inverter output current that an improved or optimal alignment between the charge transmitter and charge receiver has been achieved.

Example 20 includes the subject matter of Example 19 and, optionally, further including determining a coupling coefficient based on the inverter output current.

Example 21 includes the subject matter of example 20 and, optionally, wherein the coupling coefficient is determined based on a DC input voltage and phase shift angle of the charge transmitter.

Example 22 includes the subject matter of examples 20 and/or 21 and, optionally, further including incrementally shifting a position of the charge transmitter relative to the charge receiver or vice versa while determining whether a position shift improves or worsens the coupling coefficient, until an optimal position of the charge transmitter relative to the charge receiver corresponding to the optimal alignment having an optimal coupling coefficient is found.

Example 23 includes the subject matter of example 22 and, optionally, wherein the incrementally shifting the position of the charge transmitter or charge receiver is performed in X, Y and/or Z directions and/or by rotation about X, Y and/or Z axes.

Example 24 includes the subject matter of any one or more of the examples 19-23 and, optionally, further including deactivating the short circuit assembly and initiating energy transfer between the charge transmitter and charge receiver when the optimal alignment is achieved.

Example 25 includes the subject matter of any one or more of the examples 19-24 and, optionally, wherein the charge receiver may be mounted on an electric vehicle (EV) and be configured to transfer power to a load on the EV.

Example 26 includes the subject matter of any one or more of the examples 19-25 and, optionally, wherein the charge receiver may be mounted on a mobile power unit, and wherein the mobile power unit includes a drive assembly configured to propel and steer the mobile power unit.

Example 27 includes the subject matter of any one or more of the examples 19-26 and, optionally, wherein the charge transmitter includes a transmitter wireless coupler and the charge receiver includes a receiver wireless coupler.

Example 28 includes the subject matter of any one or more of the examples 19-27, and, optionally, wherein a WPT technique includes inductive coupling/charging.

Example 29 includes the subject matter of any one or more of the examples 19-27 and, optionally, wherein a WPT technique is capacitive coupling/charging.

Example 30 includes the subject matter of any one or more of the examples 19-29 and, optionally, wherein the short circuit assembly is integrated into the rectifier.

Example 31 includes the subject matter of any one or more the examples 19-29 and, optionally, wherein the charge receiver includes a receiver compensating network, and wherein the short circuit assembly is positioned between the rectifier and the receiver compensating network.

Example 32 includes the subject matter of any one or more of the examples 19-31 and, optionally, wherein the charge transmitter includes a transmitter comms module and the charge receiver includes a receiver comms module, and wherein the transmitter comms module may be in data communications with receiver comms module.

Example 33 includes the subject matter of any one or more of the examples 19-32 and, optionally wherein the rectifier is a passive full bridge rectifier including, e.g., 4 diodes, and wherein the short circuit assembly includes, e.g., a pair of transistors positioned between the rectifier and the receiver compensating network.

Example 34 includes the subject matter of any one or more of the examples 19-32 and, optionally, wherein the rectifier is a passive full bridge rectifier including, e.g., 4 diodes, and wherein the short circuit assembly includes, e.g., two transistors in parallel to two lower diodes of the rectifier.

Example 35 includes the subject matter of any one or more of the examples 19-32 and, optionally, wherein the rectifier is a semi active rectifier including two diodes and8or two transistors, and wherein the two transistors function as the short circuit assembly.

Example 36 includes the subject matter of any one or more of the examples 19-32 and, optionally, wherein the rectifier is an active rectifier including, e.g., 4 rectifier transistors, and wherein a top or bottom pair of the, e.g., 4 rectifier transistors functions as the short circuit assembly.

According to some embodiments, a memory may include one or more types of computer-readable storage media. A memory may include transactional memory and/or long-term storage memory facilities and may function as file storage, document storage, program storage, or as a working memory. The latter may for example be in the form of a static random access memory (SRAM), dynamic random access memory (DRAM), read-only memory (ROM), cache and/or flash memory. As working memory, temporally-based and/or non-temporally based instructions may be included. As long-term memory, a volatile or non-volatile computer storage medium, a hard disk drive, a solid state drive, a magnetic storage medium, a flash memory and/or other storage facility may be employed. A hardware memory facility may for example store a fixed information set (e.g., software code) including, but not limited to, a file, program, application, source code, object code, data, and/or the like.

The term "processor", as used herein, may additionally or alternatively refer to a controller. A processor may be implemented by various types of processor devices and/or processor architectures including, for example, embedded processors, communication processors, graphics processing unit (GPU)-accelerated computing, soft-core processors and/or general purpose processors.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a processor chip or a circuit. As software or algorithm, selected steps of the disclosure could be implemented as a plurality of software instructions being executed by a computer/processor using any suitable operating system. In any case, selected steps of the method and system of the disclosure could be described as being performed by a data processor, such as a computing device for executing a plurality of instructions.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

To provide for interaction with a user, the systems and techniques described here can be implemented on a computing device having a display (indicator/monitor/screen/array) (such as a LED (light-emitting diode), OLED (organic LED), LCD (liquid crystal display) or other display technology) for displaying information to the user and a keyboard and a pointing device (e.g., a mouse, joystick or a trackball) or individual buttons/knobs/levers (such as driving wheel buttons/signaling levers) by which the user can provide input to the computing device. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, analysis of user head position and/or eye movements, or tactile input.

It should be appreciated that the above-described methods and apparatus may be varied in many ways, including omitting, or adding steps, changing the order of steps and the type of devices used. It should be appreciated that different features may be combined in different ways. In particular, not all the features shown above in a particular embodiment or implementation are necessary in every embodiment or implementation of the disclosure. Further combinations of the above features and implementations are also considered to be within the scope of some embodiments or implementations of the disclosure.

It is important to note that the methods described herein and illustrated in the accompanying diagrams shall not be construed in a limiting manner. For example, methods described herein may include additional or even fewer processes or operations in comparison to what is described herein and/or illustrated in the diagrams. In addition, method steps are not necessarily limited to the chronological order as illustrated and described herein.

Any digital computer system, unit, device, module and/or engine exemplified herein can be configured or otherwise programmed to implement a method disclosed herein, and to the extent that the system, module and/or engine is configured to implement such a method, it is within the scope and spirit of the disclosure. Once the system, module and/or engine are programmed to perform particular functions pursuant to computer readable and executable instructions from program software that implements a method disclosed herein, it in effect becomes a special purpose computer particular to embodiments of the method disclosed herein. The methods and/or processes disclosed herein may be implemented as a computer program product that may be tangibly embodied in an information carrier including, for example, in a non-transitory tangible computer-readable and/or non-transitory tangible machine-readable storage device. The computer program product may be directly loadable into an internal memory of a digital computer, comprising software code portions for performing the methods and/or processes as disclosed herein.

The methods and/or processes disclosed herein may be implemented as a computer program that may be intangibly embodied by a computer readable signal medium. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer or machine-readable storage device and that can communicate, propagate, or transport a program for use by or in connection with apparatuses, systems, platforms, methods, operations and/or processes discussed herein.

The terms "non-transitory computer-readable storage device" and "non-transitory machine-readable storage device" encompasses distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by one or more communication networks.

These computer readable and executable instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable and executable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable and executable instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The term "engine" may comprise one or more computer modules, wherein a module may be a self-contained hardware and/or software component that interfaces with a larger system. A module may comprise a machine or machines executable instructions. A module may be embodied by a circuit or a controller programmed to cause the system to implement the method, process and/or operation as disclosed herein. For example, a module may be implemented as a hardware circuit comprising, e.g., custom VLSI circuits or gate arrays, an Application-specific integrated circuit (ASIC), off-the-shelf semiconductors such as logic chips, transistors, and/or other discrete components. A module may also be implemented in programmable hardware devices such as field programmable gate arrays, programmable array logic, programmable logic devices and/or the like.

The term "random" also encompasses the meaning of the term "substantially randomly" or "pseudo-randomly".

In the discussion, unless otherwise stated, adjectives such as "substantially" and "about" that modify a condition or relationship characteristic of a feature or features of an embodiment of the invention, are to be understood to mean that the condition or characteristic is defined to within tolerances that are acceptable for operation of the embodiment for an application for which it is intended.

Unless otherwise specified, the terms "substantially", "about" and/or "close" with respect to a magnitude or a numerical value may imply to be within an inclusive range of −10% to +10% of the respective magnitude or value.

"Coupled with" can mean indirectly or directly "coupled with".

It is important to note that the method may include is not limited to those diagrams or to the corresponding descriptions. For example, the method may include additional or even fewer processes or operations in comparison to what is described in the figures. In addition, embodiments of the method are not necessarily limited to the chronological order as illustrated and described herein.

Discussions herein utilizing terms such as, for example, "processing", "computing", "calculating", "determining", "establishing", "analyzing", "checking", "estimating", "deriving", "selecting", "inferring" or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes. The term determining may, where applicable, also refer to "heuristically determining".

It should be noted that where an embodiment refers to a condition of "above a threshold", this should not be construed as excluding an embodiment referring to a condition of "equal or above a threshold". Analogously, where an embodiment refers to a condition "below a threshold", this should not be construed as excluding an embodiment referring to a condition "equal or below a threshold". It is clear that should a condition be interpreted as being fulfilled if the value of a given parameter is above a threshold, then the same condition is considered as not being fulfilled if the value of the given parameter is equal or below the given threshold. Conversely, should a condition be interpreted as being fulfilled if the value of a given parameter is equal or above a threshold, then the same condition is considered as not being fulfilled if the value of the given parameter is below (and only below) the given threshold.

It should be understood that where the claims or specification refer to "a" or "an" element and/or feature, such reference is not to be construed as there being only one of that element. Hence, reference to "an element" or "at least one element" for instance may also encompass "one or more elements".

Terms used in the singular shall also include the plural, except where expressly otherwise stated or where the context otherwise requires.

In the description and claims of the present application, each of the verbs, "comprise" "include" and "have", and conjugates thereof, are used to indicate that the data portion or data portions of the verb are not necessarily a complete listing of components, elements or parts of the subject or subjects of the verb.

Unless otherwise stated, the use of the expression "and/or" between the last two members of a list of options for selection indicates that a selection of one or more of the listed options is appropriate and may be made. Further, the use of the expression "and/or" may be used interchangeably with the expressions "at least one of the following", "any one of the following" or "one or more of the following", followed by a listing of the various options.

As used herein, the phrase "A, B, C, or any combination of the aforesaid" should be interpreted as meaning all of the following: (i) A or B or C or any combination of A, B, and C, (ii) at least one of A, B, and C; (iii) A, and/or B and/or C, and (iv) A, B and/or C. Where appropriate, the phrase A, B and/or C can be interpreted as meaning A, B or C. The phrase A, B or C should be interpreted as meaning "selected from the group consisting of A, B and C". This concept is illustrated for three elements (i.e., A, B, C), but extends to fewer and greater numbers of elements (e.g., A, B, C, D, etc.).

It is appreciated that certain features of the invention, which are, for clarity, described in the context of separate embodiments or example, may also be provided in combination in a single embodiment. Conversely, various features of the invention, which are, for brevity, described in the context of a single embodiment, example and/or option, may also be provided separately or in any suitable sub-combination or as suitable in any other described embodiment, example or option of the invention. Certain features described in the context of various embodiments, examples and/or optional implementation are not to be considered essential features of those embodiments, unless the embodiment, example and/or optional implementation is inoperative without those elements.

It is noted that the terms "in some embodiments", "according to some embodiments", "for example", "e.g.", "for instance" and "optionally" may herein be used interchangeably.

The number of elements shown in the Figures should by no means be construed as limiting and is for illustrative purposes only.

It is noted that the terms "operable to" can encompass the meaning of the term "modified or configured to". In other words, a machine "operable to" perform a task can in some embodiments, embrace a mere capability (e.g., "modified") to perform the function and, in some other embodiments, a machine that is actually made (e.g., "configured") to perform the function.

Throughout this application, various embodiments may be presented in and/or relate to a range format. It should be understood that the description in range format is merely for convenience and brevity and should not be construed as an inflexible limitation on the scope of the embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

While the invention has been described with respect to a limited number of embodiments, these should not be construed as limitations on the scope of the invention, but rather as exemplifications of some of the embodiments.

While certain features of the described implementations have been illustrated as described herein, many modifications, substitutions, changes, and equivalents will now occur to those skilled in the art. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations and embodiments described.

What is claimed is:

1. A wireless power transmission (WPT) system comprising:

a charge transmitter;

a charge receiver configured to receive wireless power from the charge transmitter, wherein the charge receiver includes a short circuit assembly configured, when activated, to short circuit a rectifier of the charge receiver; and a controller configured to activate the short circuit assembly, and to determine based on an inverter output current of the charge transmitter that an improved or optimal alignment between the charge transmitter and charge receiver has been achieved;

wherein, during the determining, a transmitter-side reactance ($X_T$), receiver-side reactance ($X_S$), >>transmitter-side resistance ($R_T$), receiver-side resistance ($R_S$).

2. The WPT system of claim 1, wherein the controller is configured to determine a coupling coefficient based on the inverter output current.

3. The WPT system of claim 2, wherein the coupling coefficient is further determined based on a DC input voltage and phase shift angle of the charge transmitter.

4. The WPT system of claim 2, wherein the determining that an optimal alignment has been achieved includes an iterative process of incrementally shifting a position of the charge transmitter relative to the charge receiver or vice versa while determining whether a position shift improves or worsens the coupling coefficient, until an optimal position of the charge transmitter relative to the charge receiver corresponding to the optimal alignment having an optimal coupling coefficient is found.

5. The WPT system of claim 4, wherein the incrementally shifting the position of the charge transmitter or charge receiver is performed in X, Y, and/or Z directions, and/or by rotation about X, Y, and/or Z axes.

6. The WPT system of claim 1, wherein the controller is further configured to deactivate the short circuit assembly and initiate energy transfer between the charge transmitter and charge receiver when the optimal alignment is achieved.

7. The WPT system of claim 1, wherein the charge receiver may be mounted on an electric vehicle (EV) and be configured to transfer power to a load on the EV.

8. The WPT system of claim 1, wherein the charge receiver may be mounted on a mobile power unit, and wherein the mobile power unit includes a drive assembly configured to propel and steer the mobile power unit.

9. The WPT system of claim 1, wherein the charge transmitter includes a transmitter wireless coupler and the charge receiver includes a receiver wireless coupler.

10. The WPT system of claim 1, wherein a WPT technique is inductive coupling/charging.

11. The WPT system of claim 1, wherein a WPT technique is capacitive coupling/charging.

12. The WPT system of claim 1, wherein the short circuit assembly is integrated into the rectifier.

13. The WPT system of claim 1, wherein the charge receiver includes a receiver compensating network, and wherein the short circuit assembly is positioned between the rectifier and the receiver compensating network.

14. The WPT system of claim 1, wherein the charge transmitter includes a transmitter comms module and the charge receiver includes a receiver comms module, and wherein the transmitter comms module may be in data communications with receiver comms module.

15. The WPT system of claim 1, wherein the rectifier is a passive full bridge rectifier including 4 diodes, and wherein the short circuit assembly includes a pair of transistors positioned between the rectifier and a receiver compensating network.

16. The WPT system of claim 1, wherein the rectifier is a passive full bridge rectifier including 4 diodes, and wherein the short circuit assembly includes two transistors in parallel to two lower diodes of the rectifier.

17. The WPT system of any claim 1, wherein the rectifier is a semi active rectifier including two diodes and two transistors, and wherein the two transistors function as the short circuit assembly.

18. The WPT system of any claim 1, wherein the rectifier is an active rectifier including 4 rectifier transistors, and wherein a top or bottom pair of the 4 rectifier transistors functions as the short circuit assembly.

19. A method comprising:

providing a wireless power transfer system including a controller, a charge transmitter and a charge receiver, wherein the charge receiver is configured to receive wireless power from the charge transmitter, and wherein the charge receiver includes a short circuit assembly configured, when activated, to short circuit a rectifier of the charge receiver;

by the controller, activating the short circuit assembly;

measuring an inverter output current of the charge transmitter; and determining based on the inverter output current that an improved or optimal alignment between the charge transmitter and charge receiver has been achieved;

wherein, during the determining, a transmitter-side reactance ($X_T$), receiver-side reactance ($X_S$), >>transmitter-side resistance ($R_T$), receiver-side resistance ($R_S$).

20. The method of claim 19, further including determining a coupling coefficient based on the inverter output current.

* * * * *